(12) United States Patent
Rugeland et al.

(10) Patent No.: US 12,376,175 B2
(45) Date of Patent: *Jul. 29, 2025

(54) RADIO RESOURCE CONTROL RESUME WITHOUT CONTEXT FETCH

(71) Applicant: Telefonaktiebolaget LM Ericsson (publ), Stockholm (SE)

(72) Inventors: Patrik Rugeland, Stockholm (SE); Icaro L. J. Da Silva, Solna (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

This patent is subject to a terminal disclaimer.

(21) Appl. No.: 18/309,888

(22) Filed: May 1, 2023

(65) Prior Publication Data

US 2023/0319939 A1      Oct. 5, 2023

Related U.S. Application Data

(63) Continuation of application No. 17/509,525, filed on Oct. 25, 2021, now Pat. No. 11,641,689, which is a (Continued)

(51) Int. Cl.
*H04W 76/19*     (2018.01)
*H04L 9/40*      (2022.01)
(Continued)

(52) U.S. Cl.
CPC ........... *H04W 76/19* (2018.02); *H04W 12/08* (2013.01); *H04W 12/106* (2021.01);
(Continued)

(58) Field of Classification Search
CPC ... H04W 76/19; H04W 12/08; H04W 12/106; H04W 36/0033; H04W 76/11; H04W 76/27; H04W 36/08; H04L 63/123
See application file for complete search history.

(56) References Cited

U.S. PATENT DOCUMENTS 11,026,140 B2      6/2021    Kim et al.
2010/0232327 A1    9/2010    Kim et al.
(Continued)

FOREIGN PATENT DOCUMENTS

WO    2008060119 A1    5/2008
WO    2017101511 A1    6/2017

OTHER PUBLICATIONS

Japan Patent Office, Decision to Grant in JP 2019-541176 dated Apr. 19, 2022 (not translated).
(Continued)

*Primary Examiner* — Harry H Kim
(74) *Attorney, Agent, or Firm* — Ericsson Inc.

(57) ABSTRACT

According to certain embodiments, a target network node for communicating with a user equipment (UE) that was previously in communication with a source network node, comprises an interface operably coupled to processing circuitry. The interface is configured to receive a connection resume request from the user equipment, wherein the connection resume request comprises a resume identification associated with the source network node. The processing circuitry is configured to determine that the UE was previously in communication with the source network node. The interface is further configured to transmit the connection resume request to the source network node, receive a radio resource control (RRC) response from the source network node, and forward the RRC response to the UE.

66 Claims, 20 Drawing Sheets

Related U.S. Application Data continuation of application No. 16/482,385, filed as application No. PCT/IB2017/058444 on Dec. 27, 2017, now Pat. No. 11,160,132.

(60) Provisional application No. 62/454,578, filed on Feb. 3, 2017.

(51) Int. Cl.
  *H04W 12/08* (2021.01)
  *H04W 12/106* (2021.01)
  *H04W 36/00* (2009.01)
  *H04W 36/08* (2009.01)
  *H04W 76/11* (2018.01)
  *H04W 76/27* (2018.01)

(52) U.S. Cl.
  CPC ........ *H04W 36/0033* (2013.01); *H04W 76/11* (2018.02); *H04W 76/27* (2018.02)

(56) References Cited

U.S. PATENT DOCUMENTS

| | | | |
|---|---|---|---|
| 2011/0039552 | A1 | 2/2011 | Narasimha et al. |
| 2013/0244672 | A1* | 9/2013 | Lin .................... H04W 76/10 455/450 |
| 2015/0043490 | A1 | 2/2015 | Wu |
| 2015/0237540 | A1 | 8/2015 | Van Lieshout et al. |
| 2016/0278160 | A1 | 9/2016 | Schliwa-Bertling et al. |
| 2016/0330787 | A1 | 11/2016 | Patel et al. |
| 2018/0192347 | A1 | 7/2018 | Shaheen |
| 2018/0302944 | A1 | 10/2018 | Chang et al. |
| 2019/0021134 | A1 | 1/2019 | Zhang et al. |
| 2019/0174421 | A1* | 6/2019 | Quan .................... H04W 76/27 |
| 2019/0215893 | A1* | 7/2019 | Yu ..................... H04W 56/0045 |
| 2019/0261271 | A1 | 8/2019 | Hisashi et al. |
| 2019/0357109 | A1 | 11/2019 | Hong et al. |
| 2022/0232374 | A1 | 7/2022 | Yoo et al. |

OTHER PUBLICATIONS

Intellectual Property India, Official Action dated Aug. 14, 2023, in Application No. 201917027930.
"Common and specific building blocks for light connected UEs," 3GPP TSG-RAN WG2 #95bis, Tdoc R2-166953, Ericsson, Oct. 10-14, 2016.
"Correction to UE Context Resume Function," Intel Corporation, R3-161586, 3GPP TSG RAN WG3 Meeting #93, Aug. 22-26, 2016.
"Design details for light connection model A," Qualcomm Incorporated, R2-168345, 3GPP TSG-RAN WG2 Meeting #96, R2-168345, Nov. 14-18, 2016.
"Security for RRC Connection Suspend and Resume," Ericsson, S3-160588, 3GPP TSG-SA WG3 Meeting #83, May 3-13, 2016.
3GPP TR 23.799 v14.0.0; Technical Report; 3rd Generation Partnership Project; Technical Specification Group Services and System Aspects; Study on Architecture for Next Generation System (Release 14)—Dec. 2016.
"Key Derivation Mechanism in RRC Inactive connected state to RRC connected state transition," S3-170247, 3GPP TSG SA WG3 (Security) Meeting #86, Feb. 6-10, 2017.
"Periodic RAN area updates in RRC_INACTIVE," Ericsson, R2-1700895, 3GPP TSG-RAN WG2 #97, Feb. 13-27, 2017.
"RAN area updating due to mobility in RRC_INACTIVE," Ericsson, R2-1700894, 3GPP TSG-RAN WG2 #97, Feb. 13-27, 2017.
"RRC_INACTIVE to RRC_CONNECTED," Ericsson, R2-1700885, 3GPP TSG-RAN WG2 #97, Feb. 13-17, 2017.
"Small data transmission in inactive state," 3GPP TSG-RAN WG3 NR Ad Hoc Meeting, R3-170158, Qualcomm Incorporated, Jan. 17-19, 2017.
PCT International Search Report for International application No. PCT/IB2017/058444—Mar. 20, 2018.
PCT Written Opinion of the International Searching Authority for International Application No. PCT/IB2017/058444—Mar. 20, 2018.
European Patent Office Official Action in EP Application No. 17 837 906.1-1215 dated Mar. 11, 2021.
China Patent Office, Official Action in CN Application No. 201780085564.1, dated Oct. 28, 2022 (not translated).
3GPP TSG-RAN WG2 NR AD HOC; Spokane, USA; Source: ZTE; title: Solution B Impacts (R2-1700351)—Jan. 17-19, 2017.

* cited by examiner

RADIO RESOURCE CONTROL RESUME WITHOUT CONTEXT FETCH

PRIORITY

This application is a continuation, under 35 U.S.C. § 120, of U.S. patent application Ser. No. 17/509,525 filed on Oct. 25, 2021, which is a continuation, under 35 U.S.C. § 120, of U.S. patent application Ser. No. 16/482,385 filed on Jul. 31, 2019, which is a U.S. National Stage Filing under 35 U.S.C. § 371 of International Patent Application Serial No. PCT/IB2017/058444 filed Dec. 27, 2017 and entitled "RADIO RESOURCE CONTROL RESUME WITHOUT CONTEXT FETCH" which claims priority to U.S. Provisional Patent Application No. 62/454,578 filed Feb. 3, 2017, each of which is hereby incorporated by reference in their entirety.

TECHNICAL FIELD

The present disclosure relates, in general, to wireless communications and, more particularly, to wireless communications without relocating UE context information.

BACKGROUND

In the Third Generation Partnership Project (3GPP) study item "Next Generation New Radio (NR) Access Technology," it is proposed that the Radio Resource Control (RRC) state model should be extended from 2 states (RRC_IDLE and RRC_CONNECTED) to 3 states (adding new state RRC_INACTIVE). A similar state model is also considered for Long Term Evolution (LTE) when LTE is connected to the Next Generation Core Network (also known as 5G-CN).

One aspect of the RRC_INACTIVE state is that the User Equipment (UE) and the Radio Access Network (RAN) store the Access Stratum (AS) context, and that the CN/RAN interface (called S1 in LTE/Evolved Packet Core (EPC) and NG-C in NR and LTE when connected to 5G-CN) is kept. This means that when a UE needs to reconnect to the network, it can resume an old connection, which can be much faster than setting up a new connection.

FIG. 1 illustrates an example high-level, next generation network architecture. In FIG. 1, the RAN nodes LTE eNB and NR BS (also referred to as a gNB) are connected to the Next Generation CN (NG-CN or 5G-CN) using the NG-C control interface and NG-U user plane interface. The gNB is similar in functionality as the LTE eNB.

FIG. 2 illustrates proposed state transitions for NR. The proposed procedures to transition between the states can be found in R2-1700535. In certain potential scenarios, even if the UE has stored the context in RRC_INACTIVE, the RAN can at any time discard the context and the CN/RAN connection when the UE is in RRC_INACTIVE. In case the RAN has discarded the context, the RAN will inform the UE about this when the UE sends an RRCConnectionResumeRequest message by responding with an RRCConnectionSetup message instead of an RRCConnectionResume message. In this case, the UE will also discard the context and continue to setup the RRC connection with the RRCConnectionSetupComplete message.

In scenarios where the AS context is stored and the CN/RAN connection is maintained, the CN is unaware that the UE is in RRC_INACTIVE and will consider the UE to be in ECM_CONNECTED (or the equivalent NR CN state). This means that the CN will not page the UE when incoming downlink (DL) packet(s) arrive, instead the CN will send the packets over NG-U to the RAN, and the RAN node will initiate paging (or notification) if needed.

RAN Based Notification Area

Another aspect of the RRC_INACTIVE state is the proposal of a RAN based notification area. A few of the 3GPP RAN2 assumptions concerning the RAN based notification area are:

1. RAN2 assumes that UE performs CN level location update when crossing a TA boundary when in inactive (in addition to RAN updates based on RAN areas).
2. There will be NG Core/CN Location Area code (similar to Tracking Area code) broadcast in system information of an NR Cell.

1. RAN based notification area is UE-specific and configurable by the gNB via dedicated signalling
2. There will be a unique global Cell ID broadcast in system information of NR Cell.

1 For the inactive state there will be a way to configure the UE with a RAN based notification area that is smaller than a TA.
2 A RAN notification area can cover a single cell or multiple cells The RAN based notification area—the "RAN area"—allows the UE to move freely within the area without informing the network. When the UE wants to transmit data, it shall be able to resume its connection. Thus, even if the UE can freely move within the RAN area, it will still be tracked by the CN within the Tracking Areas (TA) since the UE is expected to perform TA updates to the CN due to mobility. To handle the RAN areas, the UE will also perform RAN area updates.

Suspend & Resume Procedures for the RRC_INACTIVE State

The proposed procedures for Suspend and Resume for the new RRC state RRC_INACTIVE are illustrated in FIGS. 3 and 4.

FIG. 3 illustrates a proposed procedure for a successful RRC Connection Suspend. In the example of FIG. 3, the UE is shown initially in RRC_CONNECTED state. User data is exchanged between the UE and the NR gNB. At step 1, the NR gNB sends an RRC Connection Suspend message to the UE. The UE enters RRC_INACTIVE state.

FIG. 4 illustrates a proposed procedure for a successful RRC Connection Resume. In the example of FIG. 4, the UE is shown initially in RRC_INACTIVE state. The NR gNB sends a paging message to the UE. The UE performs Access Information acquisition. At step 1, the UE sends a Physical Random Access Channel (PRACH) preamble to the NR gNB. At step 2, the NR gNB sends a Random Access Response (RAR) to the UE. At step 3, the UE sends an RRC Connection Resume Request message to the NR gNB. At step 4, the NR gNB sends an RRC Connection Resume message to the UE. The UE enters RRC_CONNECTED state. At step 5, the UE sends an RRC Connection Resume Complete message to the NR gNB. User data is exchanged between the UE and the NR gNB.

During both the RRC Connection Suspend and RRC Connection Resume procedures, the CN/RAN connection between the gNB and the Next Gen CN is kept (meaning no NR gNB-CN signaling is needed).

Notably, in the foregoing discussion, since the UE can move around within the RAN area while in RRC_INACTIVE without informing the network, if it resumes its connection in another gNB than the one where it was suspended, the target gNB has to fetch the UE context from the source gNB.

SUMMARY

To address the foregoing problems, disclosed is a method in a target network node for communicating with a user equipment (UE) that was previously in communication with a source network node. The method includes receiving a connection resume request from a UE, the connection resume request comprises a resume identification associated with the source network node; transmitting the connection resume request to the source network node; receiving a radio resource control (RRC) response from the source network node; and forwarding the RRC response to the UE.

Also disclosed is a target network node for communicating with a user equipment (UE) that was previously in communication with a source network node. The target network node includes an interface operably coupled to processing circuitry. The interface is configured to receive a connection resume request from the UE, wherein the connection resume request comprises a resume identification associated with the source network node. The processing circuitry is configured to determine that the UE (110) was previously in communication with the source network node. The interface is further configured to transmit the connection resume 15 request to the source network node; receive a radio resource control (RRC) response from the source network node; and forward the RRC response to the UE.

In some embodiments, the target network node is a gNB and the source network node is a gNB.

In some embodiments, the connection resume request is an RRCConnectionResumeRequest. In some embodiments, the connection resume request comprises a security token. In some embodiments, the connection resume request is integrity protected using a security key used during the previous communications with the source network node. In some embodiments, small data received as part of or in conjunction with the connection resume request. In some embodiments, the connection resume request is transmitted to the source network node as part of or in conjunction with a retrieve UE context request.

In some embodiments, the RRC response is an RRCConnectionSuspend. In some embodiments, the RRC response comprises one or more of: a new resume identification associated with the source network node; a new security parameter; and a radio access network (RAN) area assignment.

In certain embodiments, the method further comprises, receiving via the interface, a UE context response from the source network node.

In certain embodiments, the method further comprises creating, via the processing circuitry, a local UE context; suspending the UE; and releasing the local UE context.

Also disclosed is a method in a source network node for facilitating communications between a user equipment (UE) and a target network node. The method includes receiving a connection resume request for the UE from the target network node, the connection resume request including a resume identification associated with the source network node. The method further includes verifying the connection resume request for the UE; generating a radio resource control (RRC) response for the UE; and transmitting the RRC response to the UE via the target network node.

Also disclosed is a source network node for facilitating communications between a user equipment (UE) and a target network node. The source network node comprises an interface operably coupled to processing circuitry. The interface is configured to receive a connection resume request for the UE from the target network node, the connection resume request including a resume identification associated with the source network node. The processing circuitry is configured to verify the connection resume request for the UE and generate a radio resource control (RRC) response for the UE. The interface is further configured to transmit the RRC response to the UE via the target network node In some embodiments, the target network node is a gNB and the source network node is a gNB.

In some embodiments, the connection resume request is an RRCConnectionResumeRequest. In some embodiments, the connection resume request comprises a security token. In some embodiments, the connection resume request is integrity protected using a security key used during previous communications with the UE. In some embodiments, small data is received as part of or in conjunction with the connection resume request. In some embodiments, the connection resume request is transmitted to the source network node as part of or in conjunction with a retrieve UE context request.

In some embodiments, the RRC response is an RRCConnectionSuspend. In some embodiments, the RRC response comprises one or more of: a new resume identification associated with the source network node; a new security parameter; and a radio access network (RAN) area assignment.

In some embodiments, the method comprises receiving, via the interface, the connection resume request from the target network node as part of a retrieve user equipment (UE) context request. In some embodiments, the method comprises transmitting, via the interface, a UE context response to the target network node. In some embodiments, the method includes assigning, via the processing circuitry, a resume identification to the UE, the resume identification associated with the source network node.

Also disclosed is a method in a user equipment (UE) for communicating with a target network node. The method includes transmitting a connection resume request to the target network node, the connection resume request including a resume identification associated with an source network node previously communicating with the UE. The method further comprises receiving a radio resource control (RRC) response originating from the source network node and forwarded to the UE by the target network node.

Also disclosed is a user equipment (UE) for communicating with a target network node. The UE includes an interface operably coupled to processing circuitry. The processing circuitry is configured to operate in a RRC_INACTIVE state. The interface is configured to transmit a connection resume request to the target network node, the connection resume request including a resume identification associated with a source network node previously communicating with the UE; and receive a radio resource control (RRC) response originating from the source network node and forwarded to the UE by the target network node.

In some embodiments, the method further includes obtaining the resume identification associated with the source network node. In some embodiments, the target network node is a gNB and the source network node is a gNB.

In some embodiments, the RRC response is an RRCConnectionSuspend. In some embodiments, the connection resume request is an RRCConnectionResumeRequest. In some embodiments, the connection resume request comprises a security token. In some embodiments, the connection resume request is integrity protected using a security key used during previous communications with source network node. In some embodiments, small data is transmitted as part of or in conjunction with the connection resume request.

In some embodiments, the RRC response comprises one or more of: a new resume identification associated with the source network node; a new security parameter; and a radio access network (RAN) area assignment.

Certain embodiments of the present disclosure may provide one or more technical advantages. For example, in certain embodiment the network does not relocate the UE context when the UE resumes its connection. Since not all gNBs are connected with equally good backhaul (e.g., if deployed in a star-shaped layout), it may be advantageous to keep the UE context in the center of the star instead of relocating it to an edge if the UE only is active for a short time. In addition, relocation of the context to a target eNB/gNB would require both signaling with the RAN and between RAN and CN. Allowing a UE to request to resume its connection or perform a RAN/CN area update in a target gNB without relocating the UE context to the target gNB may reduce network congestion. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there are a number of technical issues involved in relocating user equipment (UE) context information to a new network node, particularly when the UE will only briefly be in a connected state with the new network node. For instance, if a UE is moving while in RRC_INACTIVE and resumes its connection in a different gNB, it may not be beneficial to always relocate the UE context to the target gNB. This is especially true if the UE quickly suspends its connection back to RRC_INACTIVE. One non-limiting example of such a scenario is when the UE is performing a RAN area or CN area registration update due to mobility. Another non-limiting example of such a scenario is when the UE is performing a periodic RAN area or CN area registration update (e.g., keep alive signalling). Still another non-limiting example of such a scenario is when the UE only has very little data to send/receive before it becomes inactive again. The problem can be particularly bad for fast moving UEs that are inactive, and would require frequent context relocations.

The present disclosure contemplates various embodiments that may address these and other deficiencies associated with existing approaches. In some cases, this is achieved by enabling a UE's RRC connection to be briefly resumed in a new gNB without relocating the UE context and still ensure security. Certain embodiments disclose a mechanism for how the UE can request to resume its connection (e.g., from RRC_INACTIVE to RRC_CONNECTED) or perform a RAN/CN area update in a target gNB when the UE context is located in another gNB, without relocating the UE context to the target gNB. In certain embodiments, instead of relocating the UE context to the target gNB, the gNB containing the UE context communicates with the UE through the target gNB. Certain embodiments also allow for pre-population of the UE context to several potential target eNB/gNBs to speed up the signaling transaction. In some cases, the pre-population can also be done without removing the context in the source eNB/gNB.

RRC Connection Resume

The baseline response for RRC resume is to relocate the UE context to the target node where the UE sent the RRCConnectionResumeRequest message (also known as message 3 or msg3). This is because, if the UE has been provided with a Next Hop Chaining Counter (NCC), it can calculate the necessary security keys in order to integrity protect msg3 and be able to receive encrypted msg4 (RRC-ConnectionResume, RRCConnectionSuspend, or RRCConnectionSetup depending on if the UE should resume a context, suspend to RRC_INACTIVE, or if the context cannot be resumed-rebuild the context).

Figure 1:
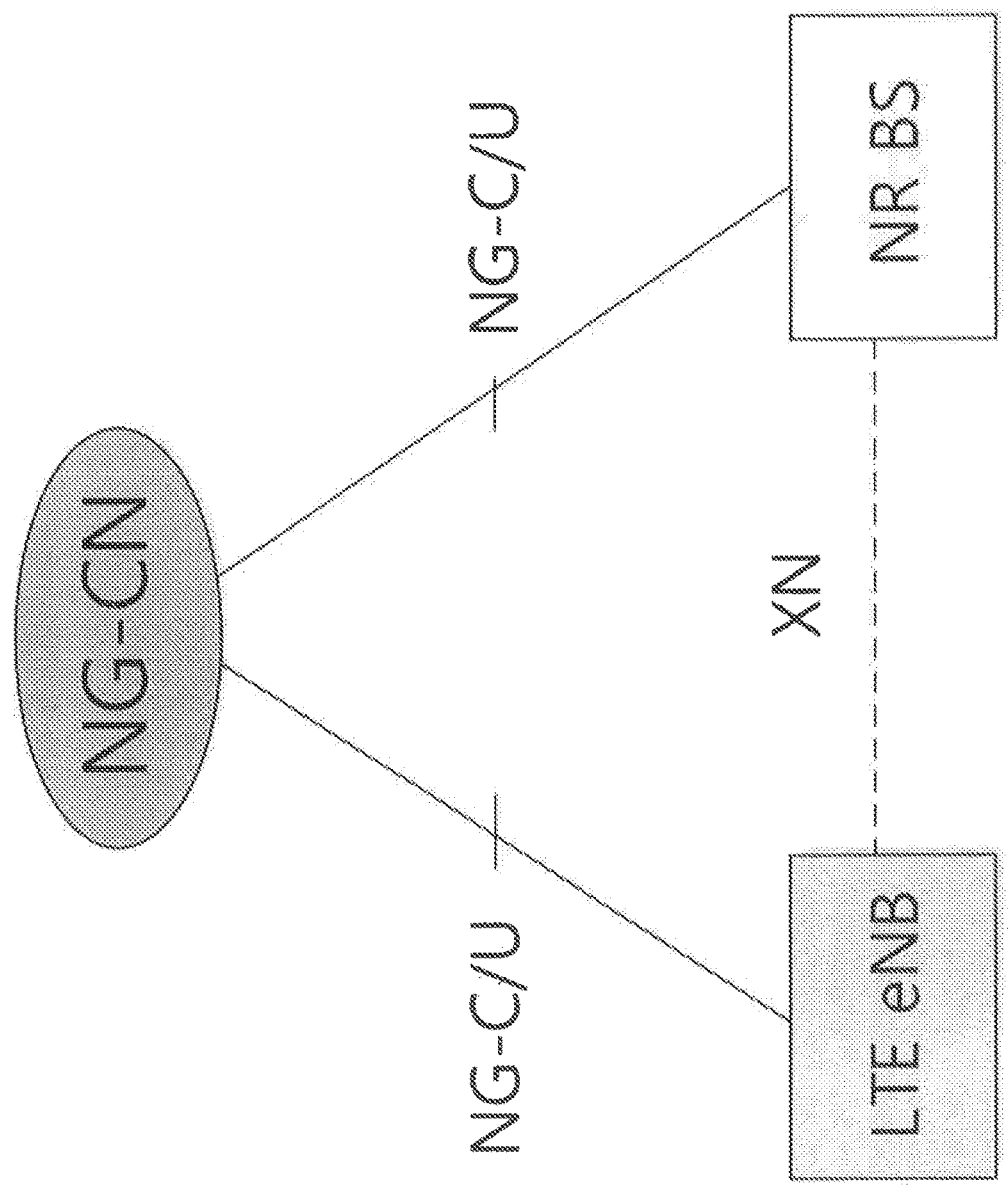
FIG. 1 illustrates an example high level next generation network architecture.
Figure 2:
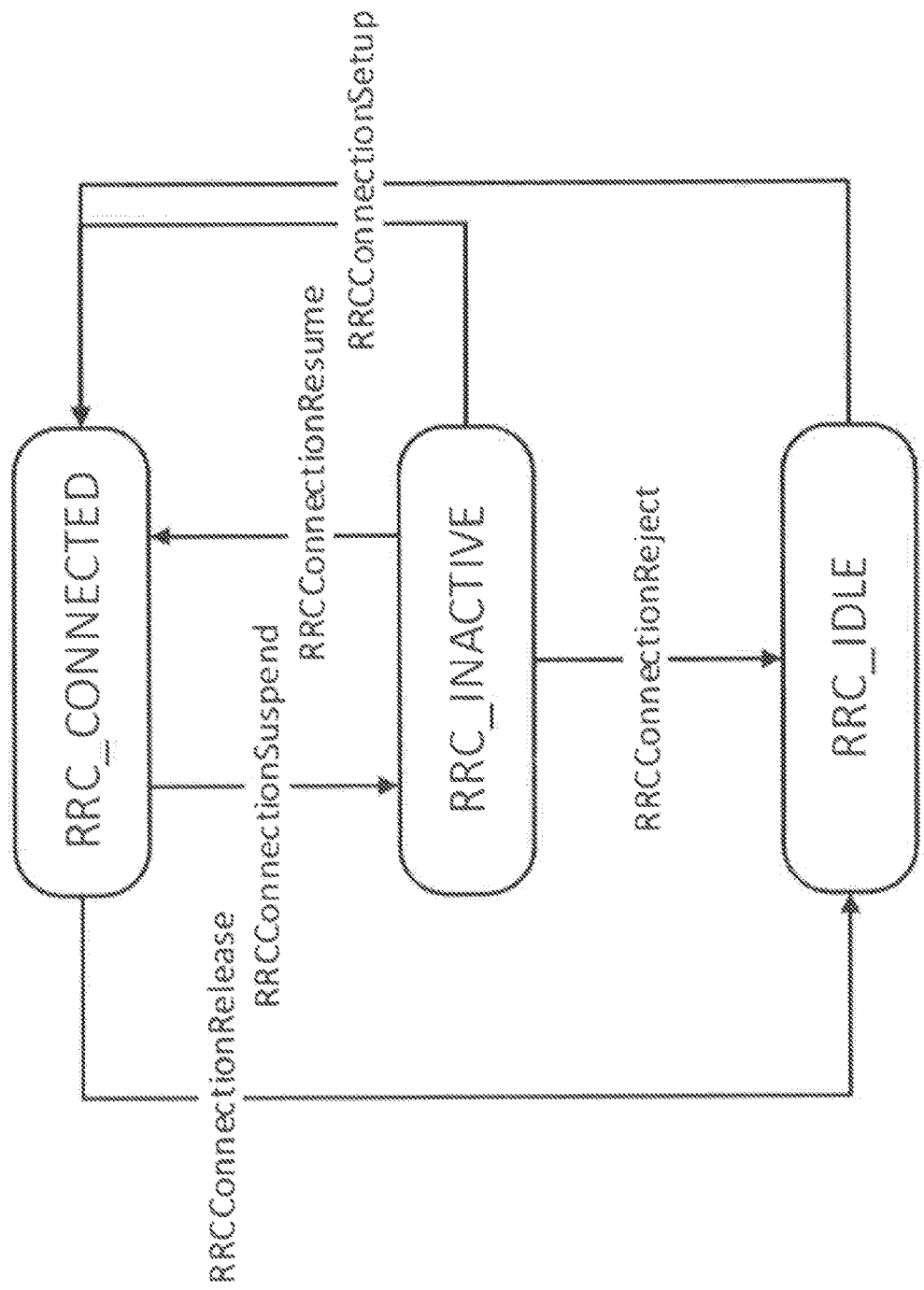
FIG. 2 illustrates proposed state transitions for NR.
Figure 3:
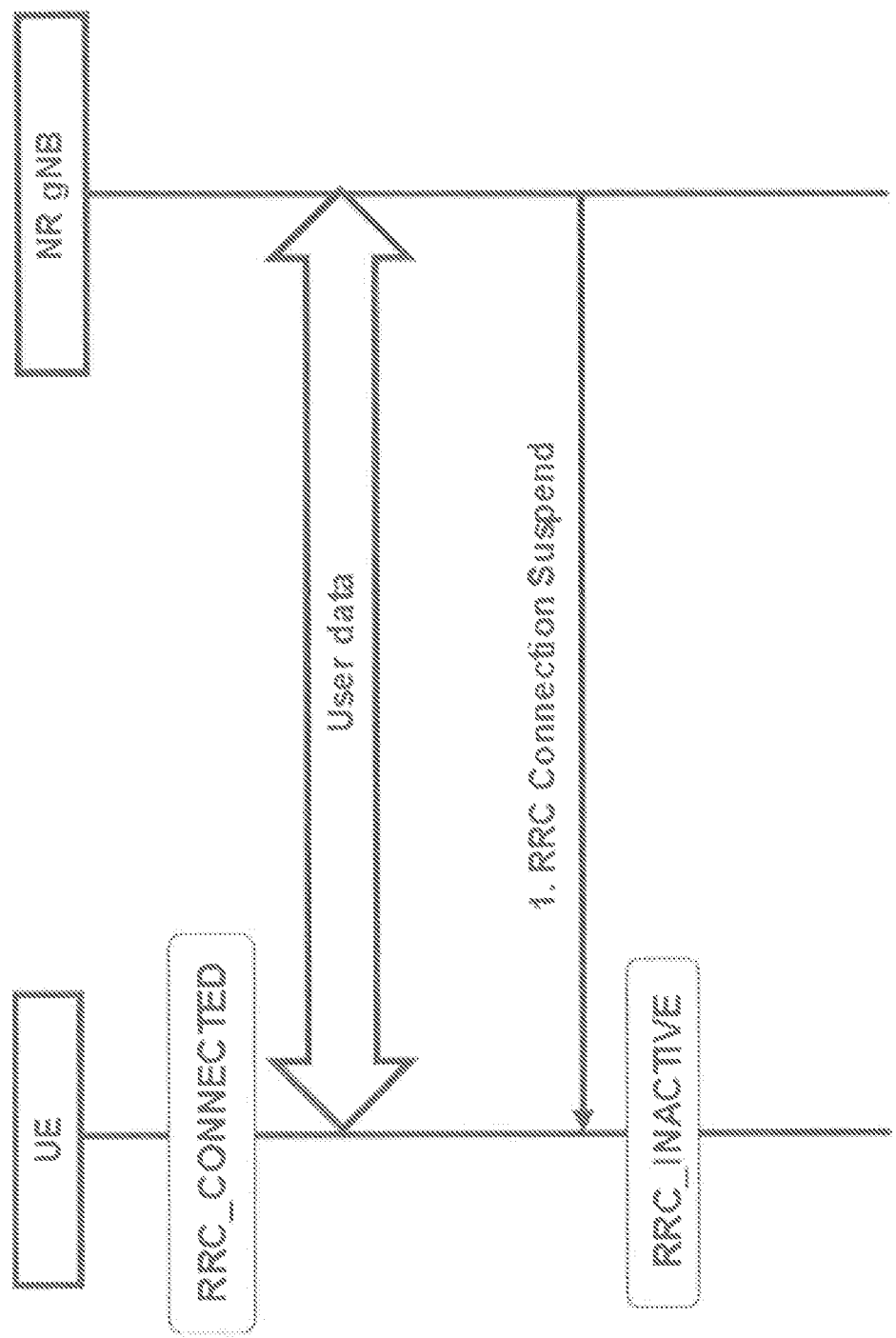
FIG. 3 illustrates a proposed procedure for a successful RRC Connection Suspend.
Figure 4:
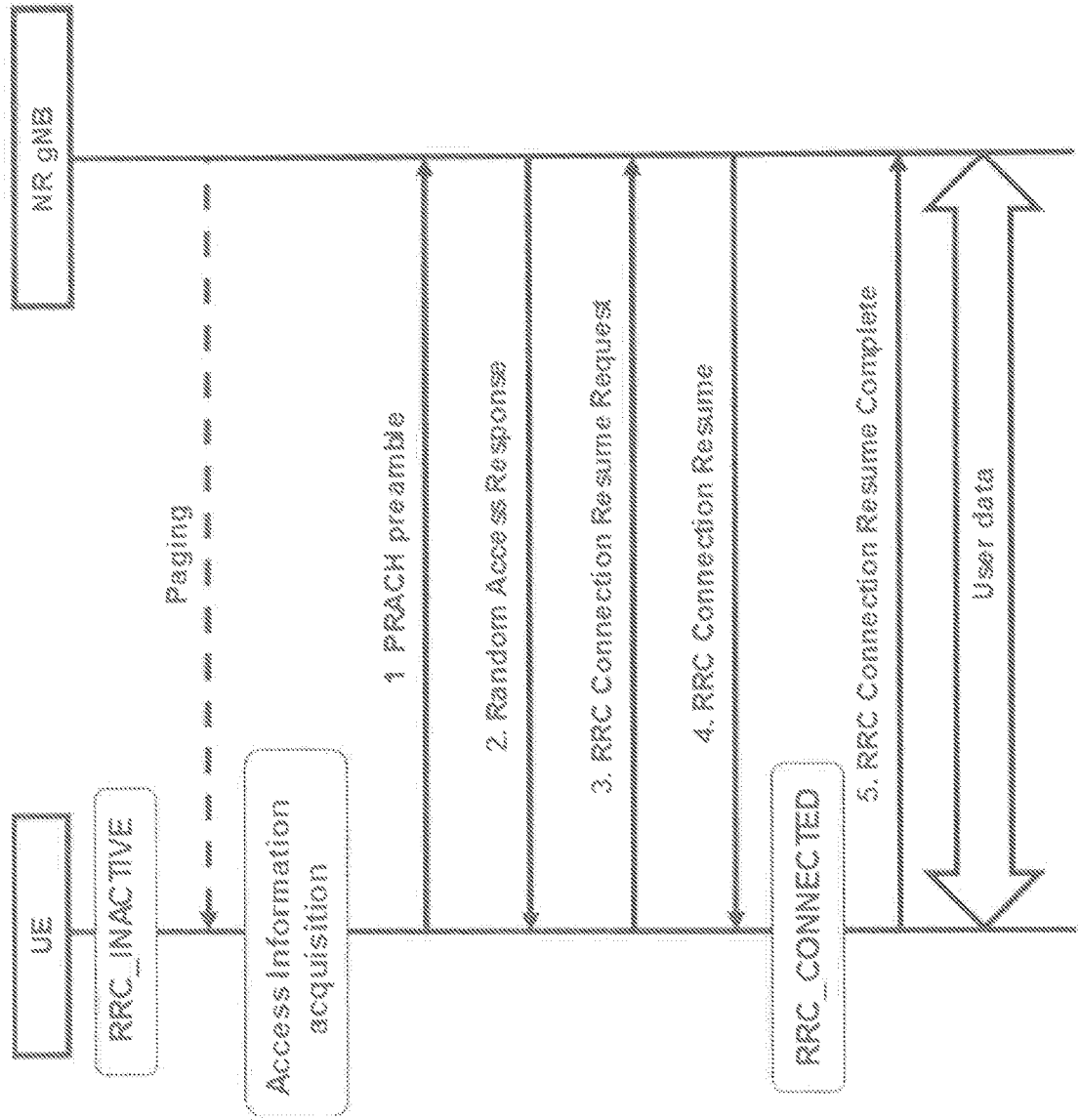
FIG. 4 illustrates a proposed procedure for a successful RRC Connection Resume.
Figure 5:
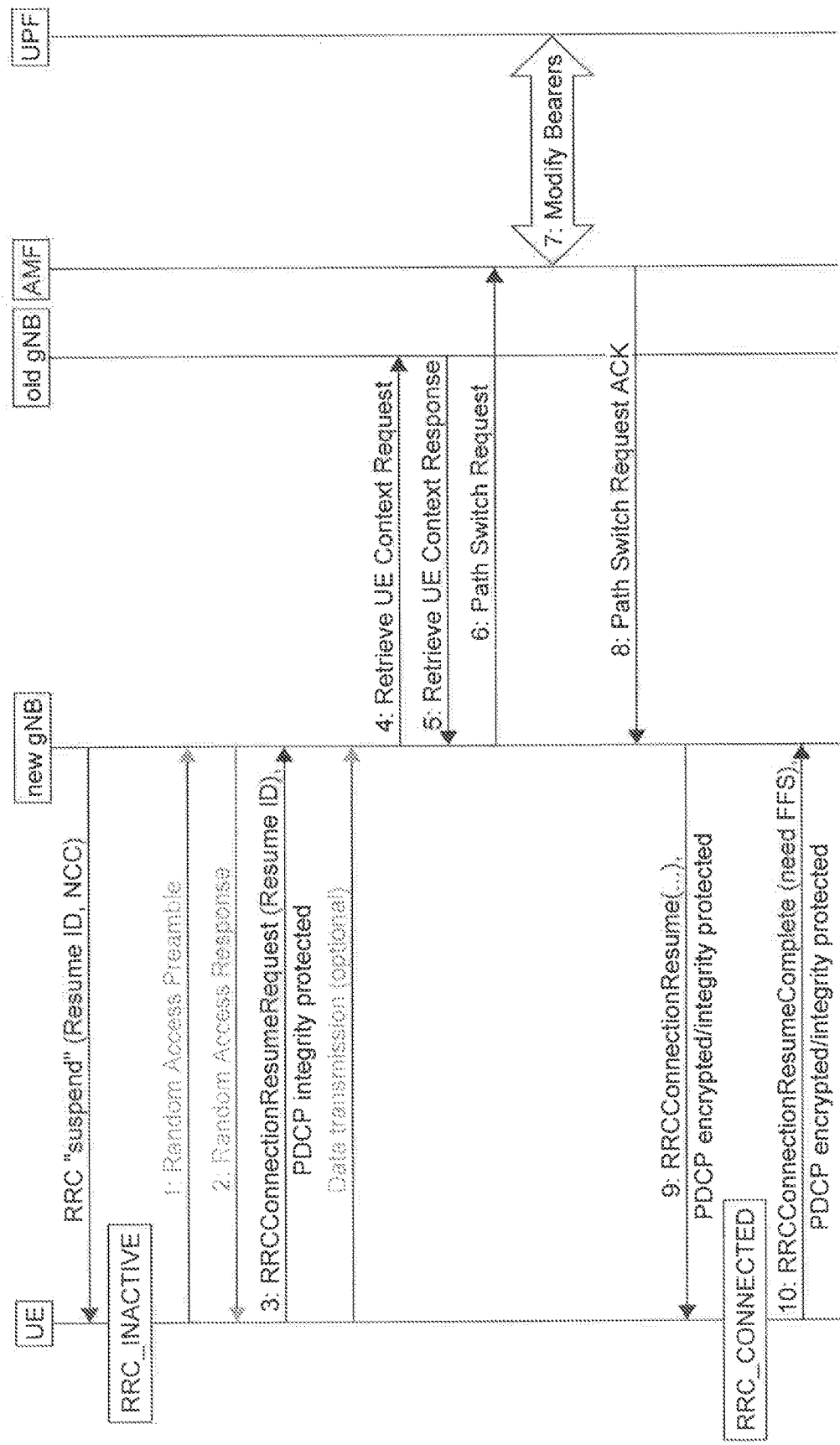
FIG. 5 illustrates an example RRC_INACTIVE to RRC_CONNECTED resume procedure, in accordance with certain embodiments.

FIG. 5 illustrates an example RRC_INACTIVE to RRC_CONNECTED resume procedure. In particular, FIG. 5 illustrates a successful resume procedure. In the example of FIG. 5, the new gNB sends an RRC "suspend" (Resume ID, NCC) to the UE. The UE enters RRC_INACTIVE state. At step 1, the UE sends a Random Access (RA) Preamble to the new gNB. At step 2, the new gNB sends a RAR to the UE. At step 3, the UE sends an RRCConnectionResumeRequest (Resume ID), Packet Data Convergence Protocol (PDCP) integrity protected to the new gNB. In some cases, data transmission occurs between the UE and the new gNB.

At step 4, the new gNB sends a Retrieve UE Context Request message to the old gNB. At step 5, the old gNB sends a Retrieve UE Context Response message to the new gNB. At step 6, the new gNB sends a Path Switch Request to the AMF. At step 7, the AMF and UPF modify bearers. At step 8, the AMF sends a Path Switch Request Acknowledgement (ACK) to the new gNB. At step 9, the new gNB sends an RRCConnectionResume message PDCP encrypted/integrity protected to the UE. The UE enters RRC_CONNECTED state. At step 10, the UE sends an RRCConnectionResumeComplete PDCP encrypted/integrity protected to the new gNB.

In the example of FIG. 5, calculating a new security key prior to message 3 (i.e., step 3) makes it possible to relocate the UE context since the new gNB/eNB should not be allowed to obtain the old key used in the old gNB/eNB. Also of note, when the UE context is relocated, the CN/RAN connection will also be switched (S1 for legacy EPC or NG for NextGenCore).

RAN Area Updates

In certain scenarios, the network may know the UE location on a RAN area level which can, for example, be a list of cells, a list of CN Tracking Areas, or a newly defined RAN area index. This means that when the UE moves outside the RAN area, it needs to inform the network. A proposed method for this is shown in FIG. 6.

Figure 6:
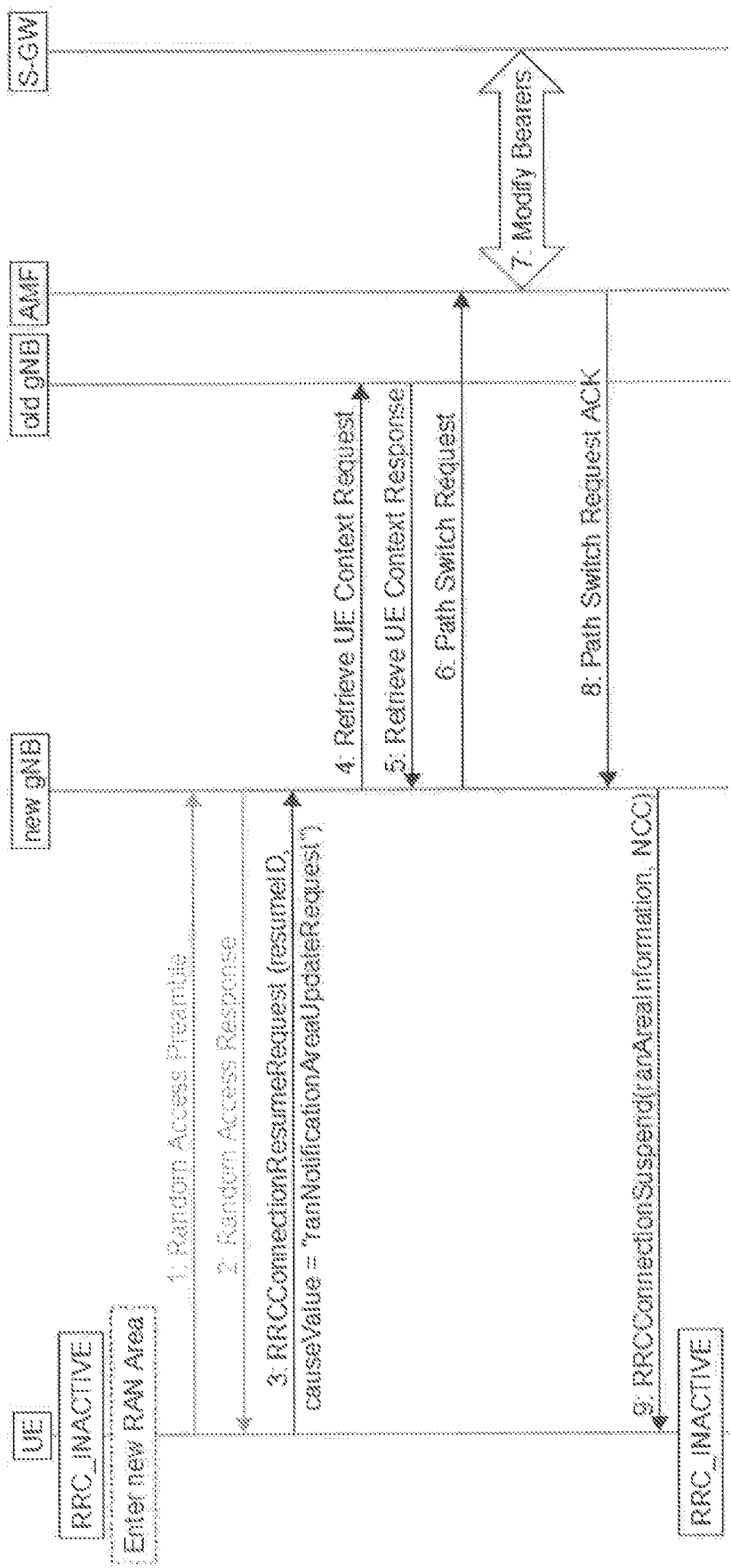
FIG. 6 illustrates an RRC connection resume to perform a RAN area update, in accordance with certain embodiments.
Figure 7:
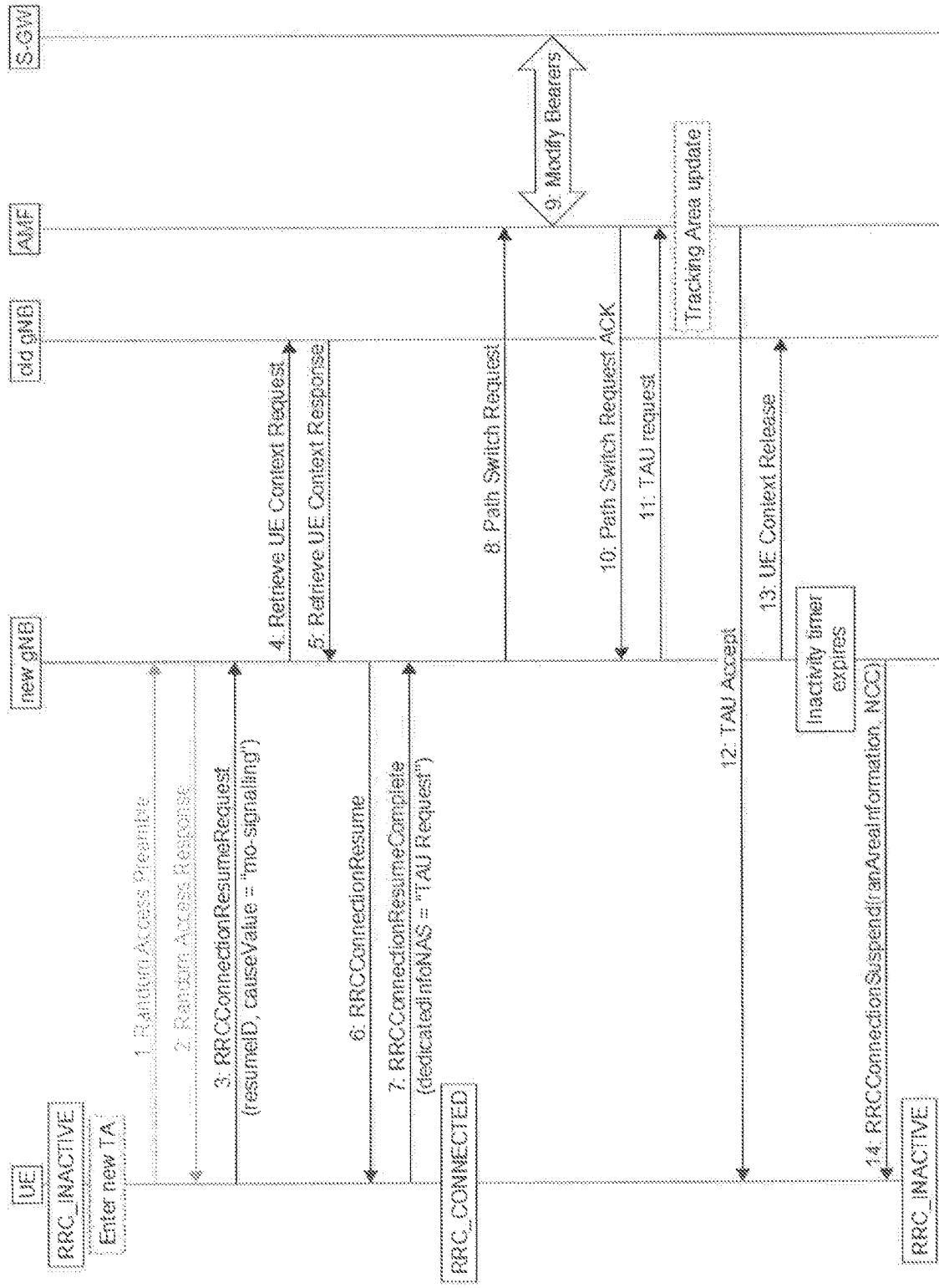
FIG. 7 illustrates an example CN Tracking Area (TA) update in RRC_INACTIVE, in accordance with certain embodiments.

FIG. 6 illustrates an RRC connection resume to perform a RAN area update. In the example of FIG. 7, the UE is initially in RRC_INACTIVE state. The UE enters a new RAN area, and at step 1 sends a RA preamble to the new gNB. At step 2, the new gNB sends a RAR message to the UE. At step 3, the UE sends an RRCConnectionResumeRequest message (resumeID, causValue="ran NotificationAreaUpdateRequest") message to the new gNB.

At step 4, the new gNB sends a Retrieve UE Context Request message to the old gNB. At step 5, the old gNB sends a Retrieve UE Context Response message to the new gNB. At step 6, the new gNB sends a Path Switch Request message to the AMF. At step 7, the AMF and S-GW modify bearers. At step 8, the AMF sends a Path Switch Request ACK message to the new gNB. At step 9, the new gNB sends an RRCConnectionSuspend (ranAreaInformation, NCC) message to the UE. The UE enters RRC_INACTIVE state.

Tracking Area Update in RRC_INACTIVE

In certain scenarios a UE should perform a CN Tracking Area update even in RRC_INACTIVE when the UE enters a TA that it is not registered in. An example procedure of this is shown in FIG. 7.

FIG. 7 illustrates an example CN Tracking Area update in RRC_INACTIVE. In the example of FIG. 7, the UE is initially in RRC_INACTIVE state. The UE enters a new TA. At step 1, the UE sends a RA preamble to the new gNB. At step 2, the new gNB sends a RAR message to the UE. At step 3, the UE sends an RRCConnectionResumeRequest message (resumeID, caus Value="mo-signalling") message to the new gNB. At step 4, the new gNB sends a Retrieve UE Context Request message to the old gNB. At step 5, the old gNB sends a Retrieve UE Context Response message to the new gNB. At step 6, the new gNB sends an RRCConnectionResume message to the UE. At step 7, the UE sends an RRCConnectionResumeComplete message (dedicatedinfoNAS="TAU Request") to the new gNB. The UE enters RRC_CONNECTED state.

At step 8, the new gNB sends a Path Switch Request message to the AMF. At step 9, the AMF and S-GW modify bearers. At step 10, the AMF sends a Path Switch Request ACK to the new gNB. At step 11, the new gNB sends a TAU request to the AMF. The AMF performs Tracking Area update. At step 12, the AMF sends a TAU Accept message to the UE. At step 13, the new gNB sends a UE Context Release message to the old gNB. Upon or after an inactivity timer expires, the new gNB sends an RRCConnectionSuspend (ranAreaInformation, NCC) message to the UE. The UE enters RRC_INACTIVE.

There are several assumptions for RAN based notification, including:

1. RAN2 assumes that UE performs CN level location update when crossing a TA boundary when in inactive (in addition to RAN updates based on RAN areas).
2. There will be NG Core/CN Location Area code (similar to Tracking Area code) broadcast in system information of an NR Cell.
3. In RAN2 the UE will perform RRC signalling in order to perform a CN update whenever it leaves its registered TA (as a consequence of the RRC signalling the RAN is aware of the UE's location)
4. Support option 2 (cell list) and/or option 3 (RAN id) (FFS which one or both)

Periodic RAN Area Updates in RRC_INACTIVE

In addition, in certain scenariuos the UE should perform periodic RAN area updates in RRC_INACTIVE, similar to what is done for periodic CN Tracking Area Updates in RRC_IDLE, in order for the network to be able to, for example, remove context of UEs which have been turned off if a UE fails to do these periodic updates (either once or multiple times, in LTE the default period for CN TAU is 54 minutes). As the UE should not do CN TAU in RRC_INACTIVE, it is necessary to do RAN area updates instead. If these fail, the RAN can inform the CN.

Figure 8:
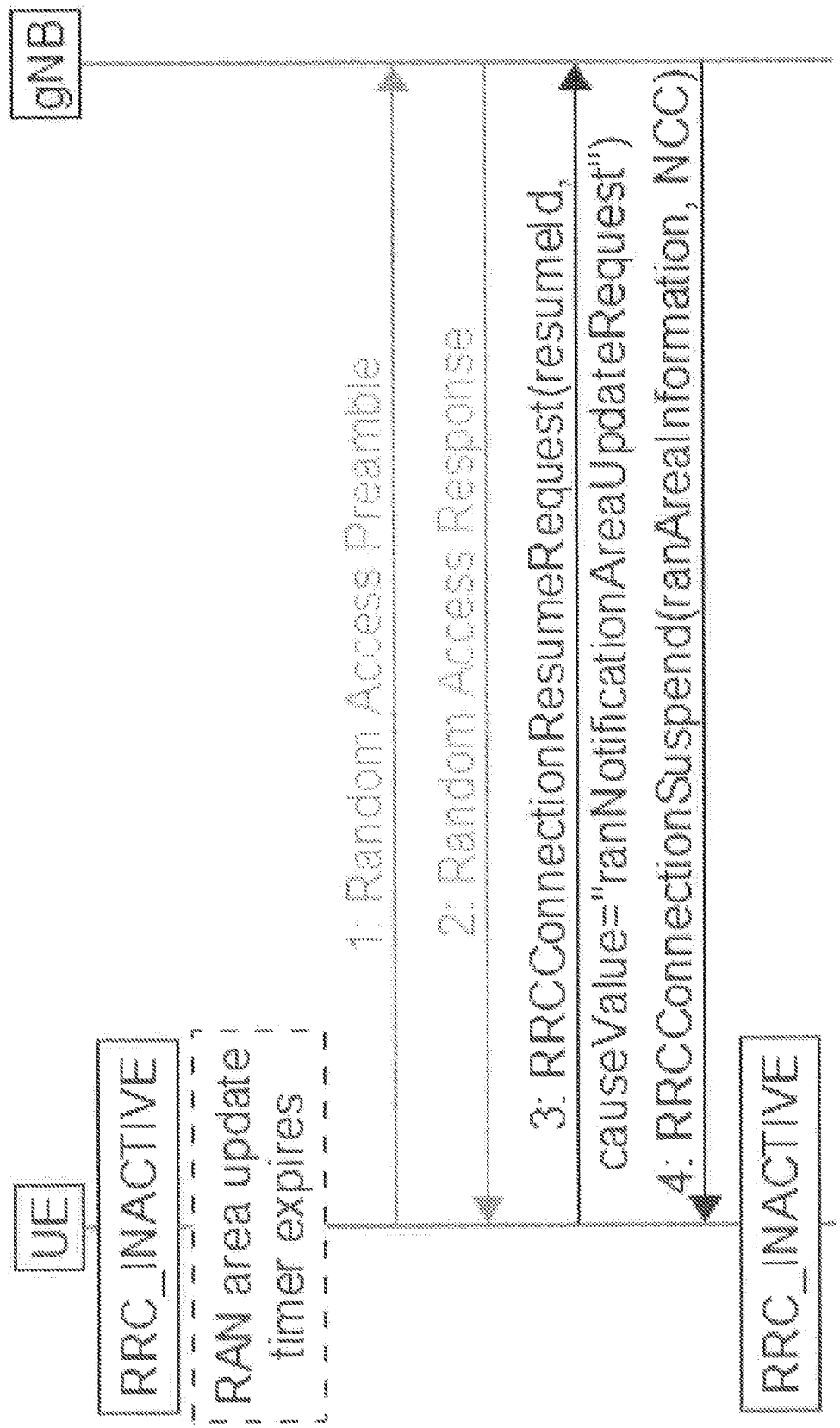
FIG. 8 illustrates an example periodic RAN area update in the old gNB, in accordance with certain embodiments.
Figure 9:
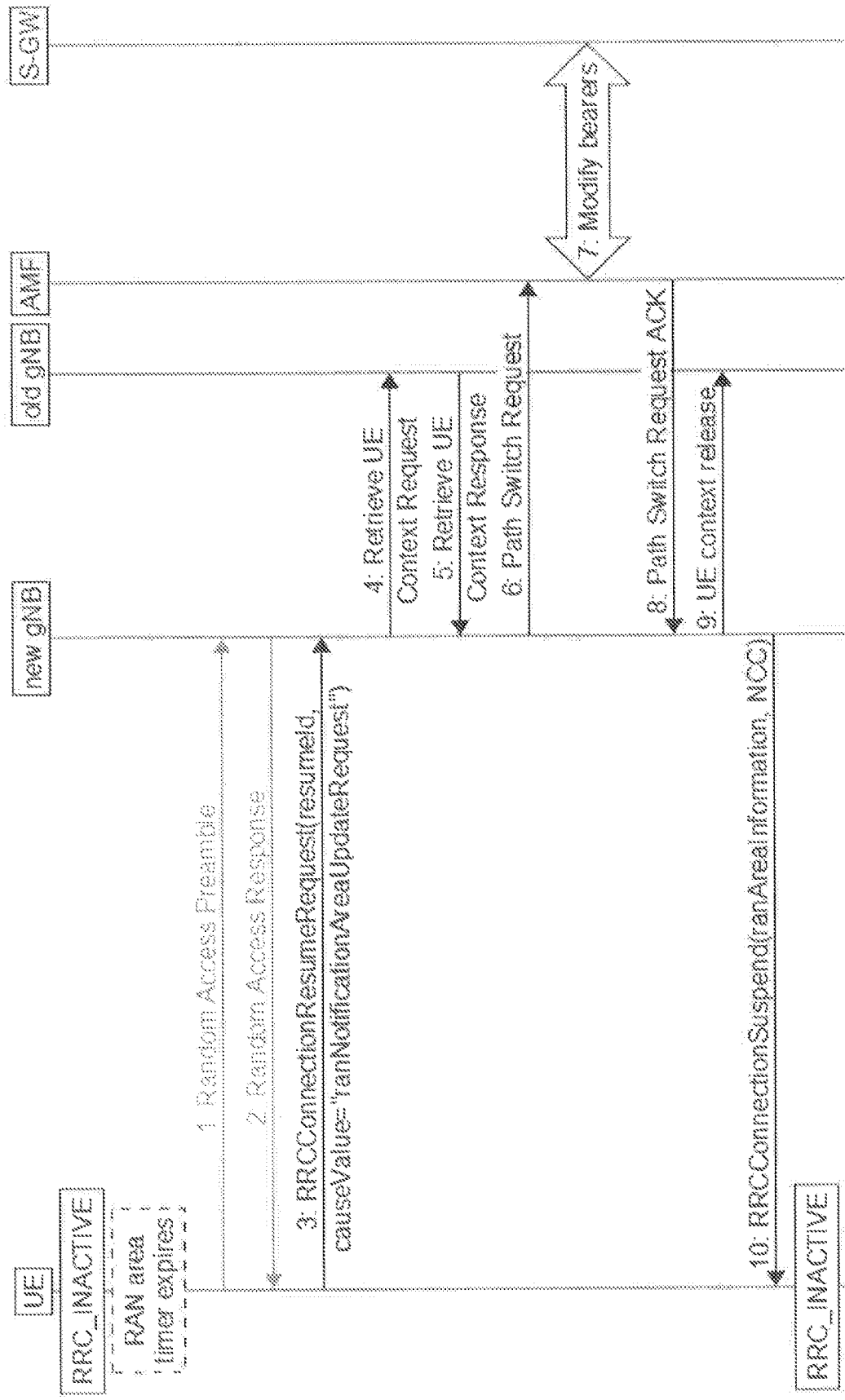
FIG. 9 illustrates an example periodic update in the new gNB in an old RAN area, in accordance with certain embodiments.

Since the UE only perform the periodic RAN area updates if it is still in its old RAN area (otherwise it would have done a mobility triggered RAN area update when it left the area), the UE could either resume the context in the old gNB or in a new gNB in the same area as shown in FIGS. 8 and 9 below, respectively.

FIG. 8 illustrates an example periodic RAN area update in the old gNB. In the example of FIG. 8, the UE is initially in RRC_INACTIVE state. Upon or after a RAN area update timer expires, the UE at step 1 sends a RA Preamble to the gNB. At step 2, the gNB sends a RAR to the UE. At step 3, the UE sends an RRCConnectionResumeRequest message (resumeId, cause Value="ranNotificationArea UpdateRequest") message to the gNB. At step 4, the gNB sends an RRCConnectionSuspend message (ranAreaInformation, NCC) message to the UE. The UE enters RRC_INACTIVE state.

FIG. 9 illustrates an example periodic update in the new gNB in an old RAN area. In the example of FIG. 9, the UE is initially in RRC_INACTIVE state. Upon or after a RAN area timer expires, the UE at step 1 sends a RA Preamble to the new gNB. At step 2, the new gNB sends a RAR message to the UE. At step 3, the UE sends an RRCConnectionResume Request (resumeId, cause Value= "ranNotificationAreaUpdateRequest") to the new gNB. At step 4, the new gNB sends a Retrieve UE Context Request message to the old gNB. At step 5, the old gNB sends a Retrieve UE Context Response message to the new gNB. At step 6, the new gNB sends a Path Switch Request message to the AMF. At step 7, the AMF and S-GW modify bearers. At step 8, the AMF sends a Path Switch Request ACK to the new gNB. At step 9, the new gNB sends a UE context release message to the old gNB. At step 10, the new gNB sends an RRCConnectionSuspend (ranAreaInformation, NCC) message to the UE. The UE enters RRC_INACTIVE state.

In the example of FIG. 8 described above, the UE context doesn't have to be relocated since the UE resumes the connection in the old gNB, while in the example of FIG. 9, the UE context is relocated.

Example Configurations

Figure 10:
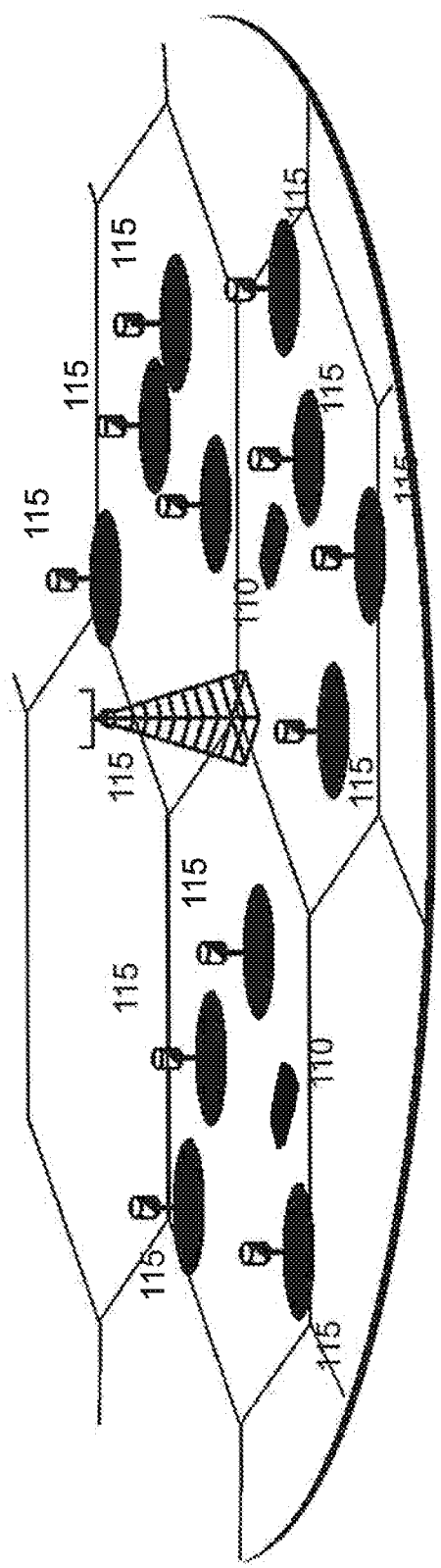
FIG. 10 illustrates an example heterogeneous network deployment, in accordance with certain embodiments.
Figure 11:
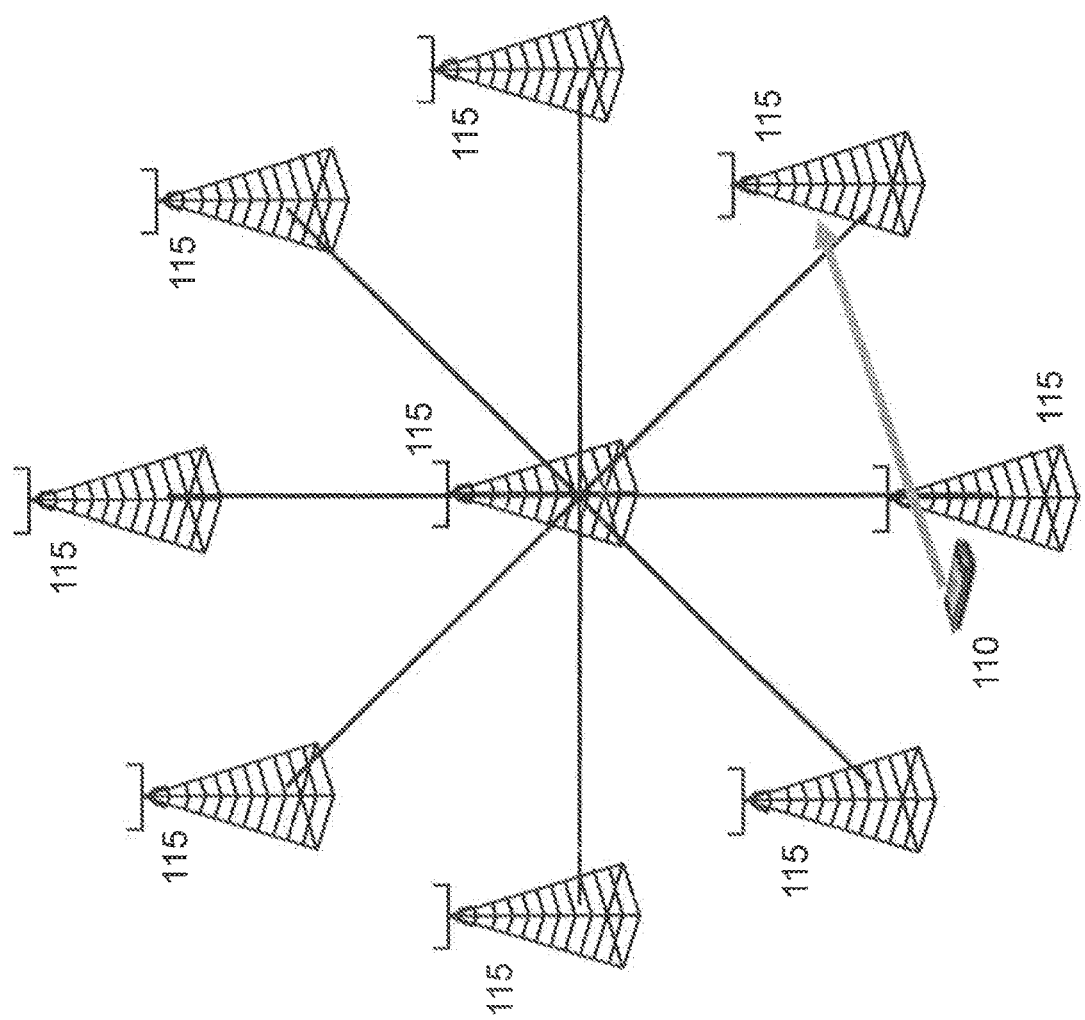
FIG. 11 illustrates an example star-shaped deployment, in accordance with certain embodiments.

FIGS. 10 and 11 illustrate two example deployments where there are technical benefits to not relocating the UE context when the UE resumes its connection. FIG. 10 illustrates an example heterogeneous network deployment, in accordance with certain embodiments. More particularly. FIG. 10 illustrates a heterogeneous network deployment with one macro cell and 12 pico cells. In the example of FIG. 10, the RAN area consists of one macro gNB (with large coverage range) and 12 pico gNBs (with much smaller coverage range). If a UE was connected to the Macro base station when it suspended its connection, and then moves while in RRC_INACTIVE so that it enters the coverage of a pico cell, when the UE resumes its connection it will do so towards the pico cell. If the UE has little or no data (e.g., only performs a RAN area update), in the baseline solution, the network would relocate the UE context to the pico cell and then quickly suspend the UE to RRC_INACTIVE. If the UE moves again when in RRC_INACTIVE, it may enter another pico cell. When it then resumes its connection, the network will need to fetch the context from the old pico cell to the new pico cell.

As described in greater detail below, in certain embodiments, the UE context may be kept in the macro gNB. When the UE resumes the connection in pico cell 1, and then suspends, the context is still in the Macro gNB. When the UE then resumes the connection in pico cell 2, the context will still be the same. In some embodiments, one option is to duplicate/pre-allocate the UE context. For example, when the UE suspends its connection, the UE context is also stored in the gNB most likely to be resumed in (e.g., all nodes in the RAN area). Alternatively, the UE context could be stored in the gNB the UE suspended in plus the Macro gNB.

FIG. 11 illustrates an example star-shaped deployment, in accordance with certain embodiments. More particularly, FIG. 11 illustrates an example deployment with nine gNBs in the same RAN area, where relocation of the UE context may not be optimal. The star-shaped deployment of FIG. 11 includes a gNB in the center of the star, connected to eight gNBs located at the arms of the star where all gNBs are included in the RAN area. The other gNBs have no direct connection between them, but are connected through the central gNB. If the UE has its UE context stored in the central gNB when it is in RRC_INACTIVE, and then moves to one of the outer gNB and performs the RRC connection resume, if the UE context is fetched to this gNB and the UE suspends back to RRC_INACTIVE, and then moves to another gNB the UE context would have to be relocated again. In certain embodiments, the UE context is stored in the central gNB and the UE resumes its context in any of the outer gNBs, so that the context would not have to be relocated.

FIGS. 10 and 11 are merely illustrative of example deployments that may benefit from embodiments of the present disclosure. The various embodiments described by are especially advantageous for scenarios where the UE has very little data to send, or only sends, for example, RAN area updates. In some cases, if the UE has a large amount of data to transmit, the UE context may still be relocated. FIGS. 12-20 provide additional explanation of embodiments of the present disclosure.

Exemplary Network

Figure 12:
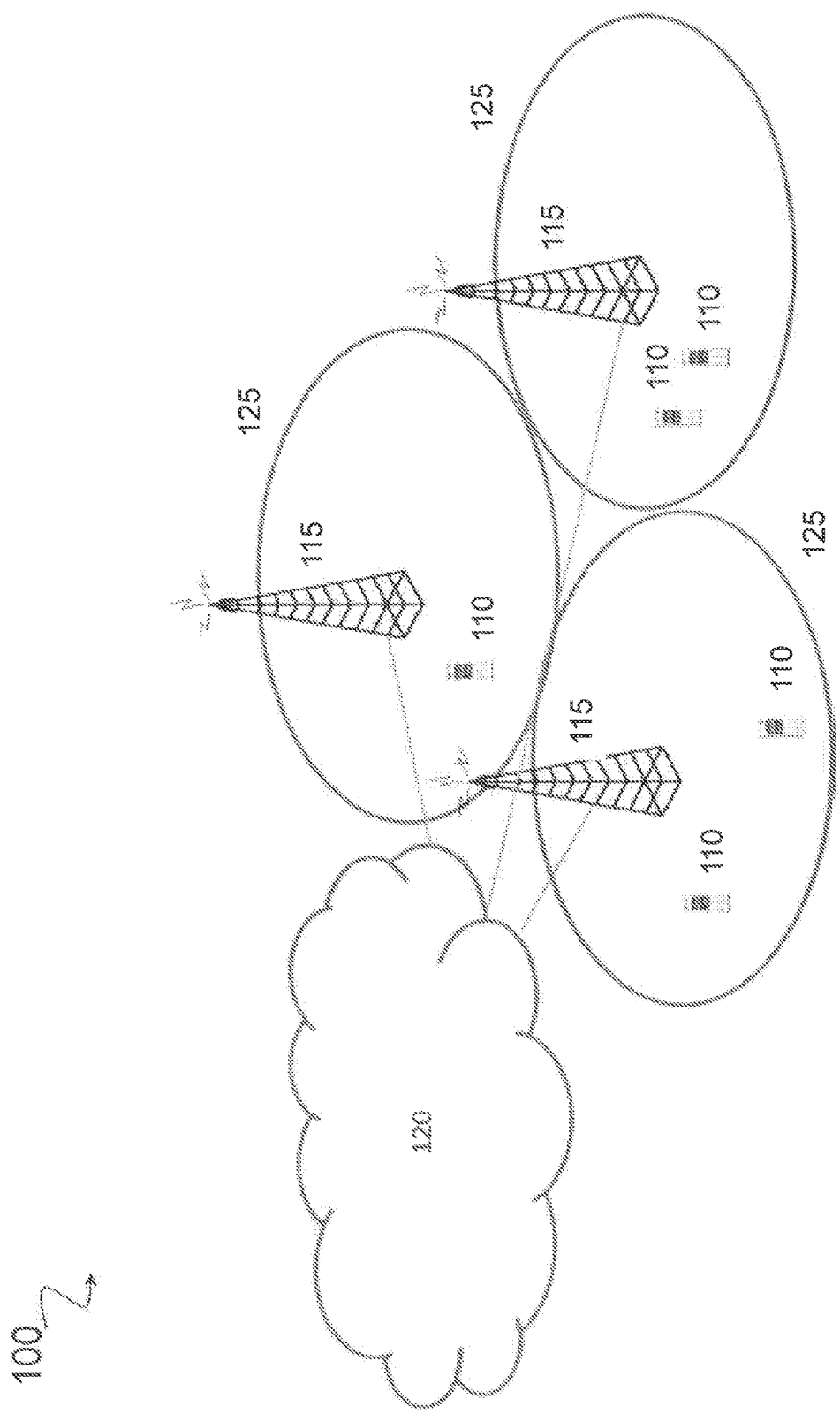
FIG. 12 is a block diagram illustrating an embodiment of a network 100, in accordance with certain embodiments.

FIG. 12 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as NR gNBs 115 or eNBs). In certain embodiments, network nodes 115 may be differentiated as network nodes 115a. 115b, 115c . . . 115n. UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, multi-standard radio (MSR) radio node such as MSR BS, evolved Node B (eNB), NR gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "gNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 13-20.

Although FIG. 12 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G, NR standards) and using any suitable components, and are applicable to any radio access technology (RAT) or multi-RAT systems in which a UE receives and/or transmits signals (e.g., data). For example, the various embodiments described herein may be applicable to Next Generation New Radio (NR) Access Technology, LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Network Node Communication Without Relocating UE Context

Figure 13:
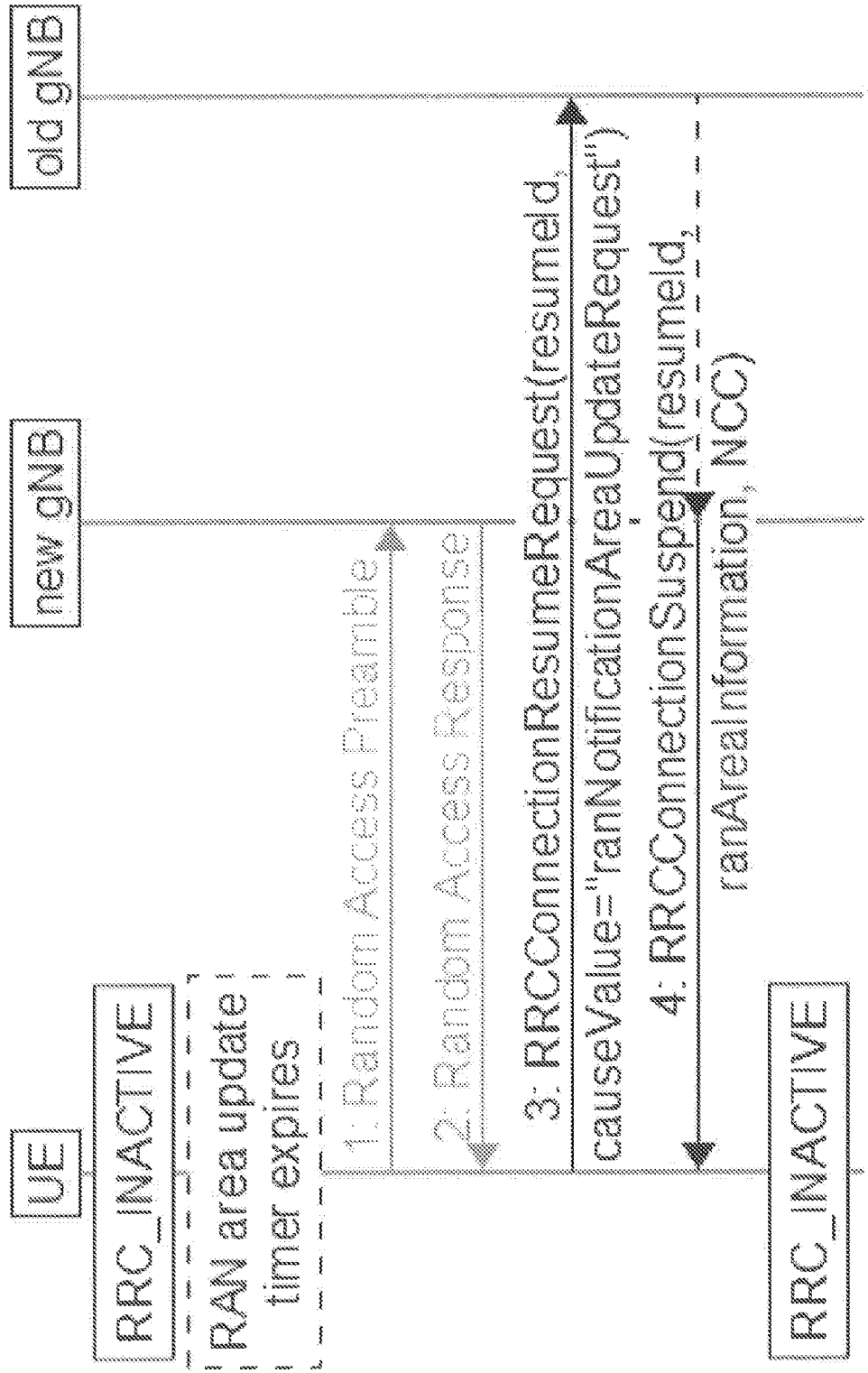
FIG. 13 illustrates an example RRCConnection Resume due to periodic RAN area update in a new gNB without context relocation, in accordance with certain embodiments.
Figure 14:
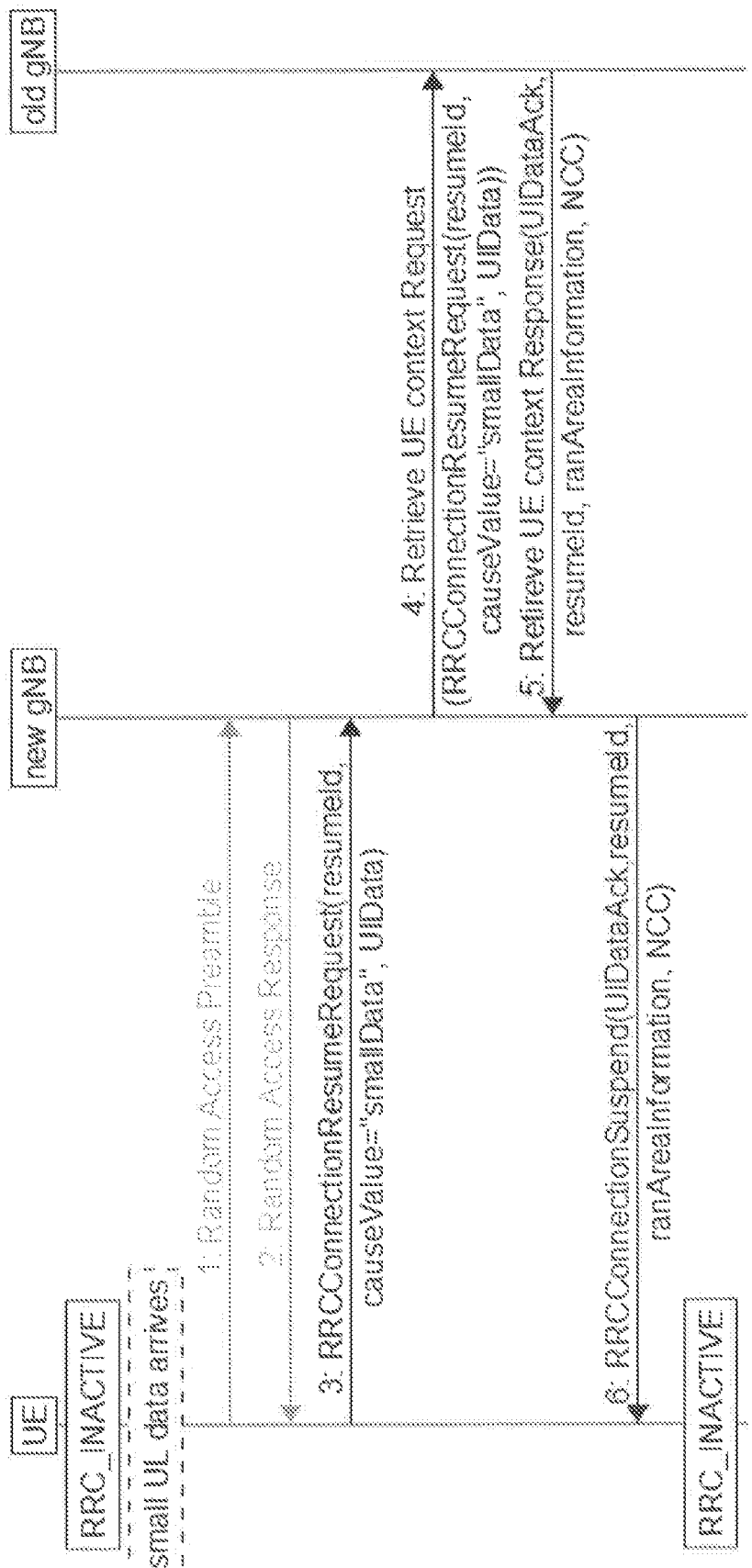
FIG. 14 illustrates an example of small data transmission in RRC_INACTIVE without UE context relocation, in accordance with certain embodiments.
Figure 15:
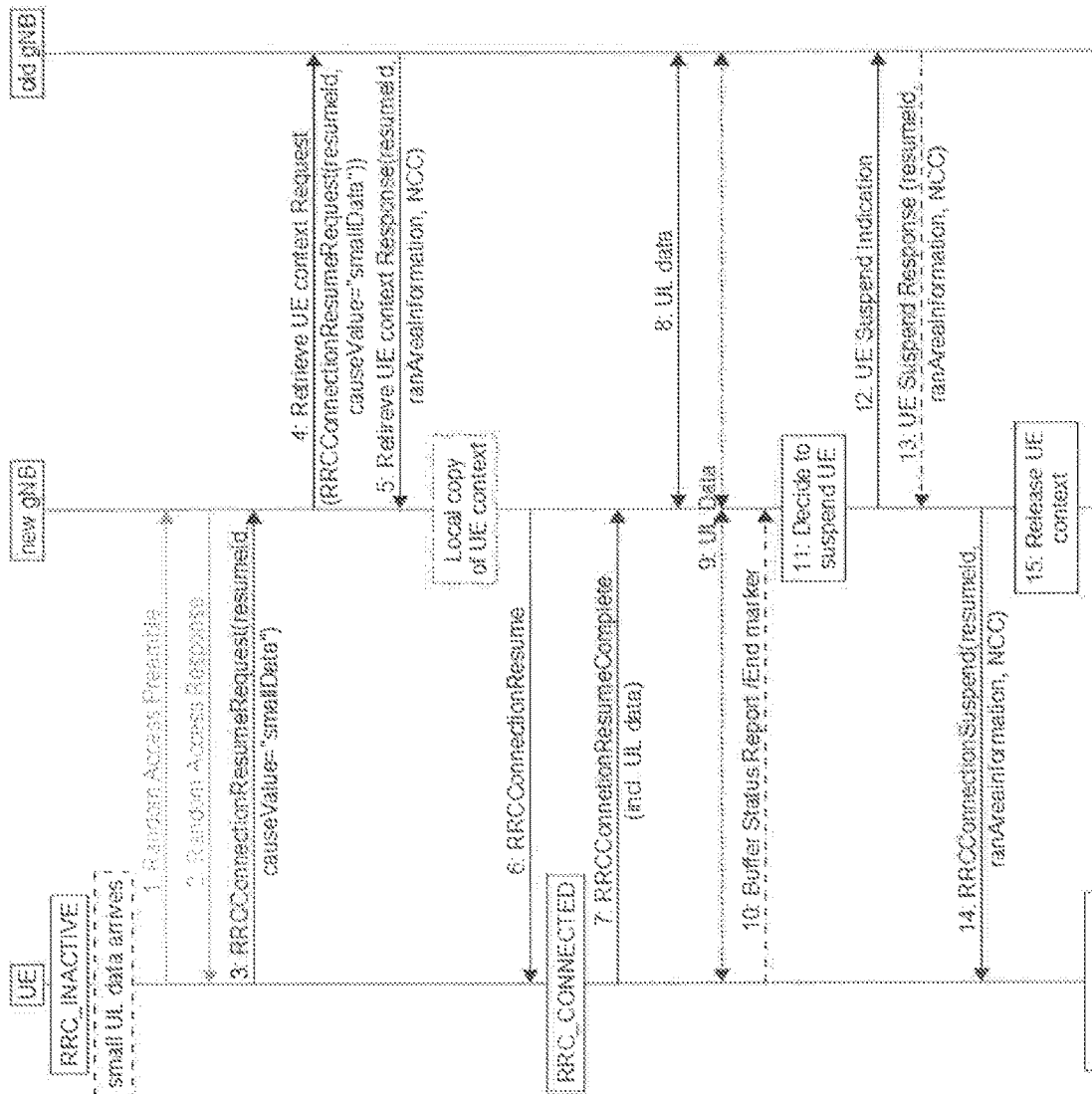
FIG. 15 illustrates an example state transition from RRC_INACTIVE to RRC_CONNECTED without context relocation for small data transmission, in accordance with certain embodiments.

FIGS. 13-15 describe example embodiments wherein a UE 110 may communicate with a new (e.g., target) gNB without relocating the UE 110 context from an old (e.g., source) gNB, while still ensuring security.

FIG. 13 illustrates an example RRCConnectionResume due to periodic RAN area update in a new gNB without context relocation, in accordance with certain embodiments. More particularly, FIG. 13 shows a signaling diagram for the case of a periodic RAN area update in a new gNB within the old RAN area. In the example of FIG. 13, the UE 110 is initially in RRC_INACTIVE state. Upon or after a RAN area update timer expires, the UE 110 at step 1 sends a RA preamble to a new gNB. At step 2, the new gNB sends a RAR message to the UE 110. At step 3, the UE 110 sends an RRCConnectionResume Request message (resumeId, cause Value="ranNotificationAreaUpdateRequest") to the new gNB. In certain embodiments, when the new gNB receives the RRCConnectionResumeRequest message, it sends the RRCConnectionResumeRequest directly to the old gNB (step 3). The new gNB may route the message to the old gNB based on the resumeID that the UE 110 provided in the RRCConnectionResumeRequest message.

According to one example embodiment, the RRCConnectionResumeRequest message includes a security token (e.g., Short-MAC-I) calculated using an old security key (e.g., used by the UE 110 in the old cell) as well as other parameters such as a target cell ID/frequency band. The old gNB may verify the security token to ensure the message is from the right UE 110.

According to another example embodiment, the RRCConnectionResumeRequest may be integrity protected using the old security key (e.g., using PDCP integrity protection (PDCP Medium Access Control (MAC)). The old gNB verifies the integrity of the message.

According to another example embodiment, the RRCConnectionResumeRequest is integrity protected using a new security key (e.g., using PDCP integrity protection (PDCP MAC)). The new security key may be derived by the UE 110 in the new cell (e.g., based on the old key, plus additional parameters). The old gNB may also derive the new key and use this to verify the integrity of the message.

At this stage the old gNB has verified that it is the right UE 110 sending the resume request. As a result of this, at step 4 the old gNB will generate an RRC response message (e.g., RRCConnectionSuspend) which may be integrity protected and/or ciphered using the old or new key. The message will be transparently forwarded to the UE 110 via the new gNB (step 4). The message may also include assignment of a new resumeID (still pointing to the old gNB) and additional parameters such as, new security parameter (e.g., NCC) or RAN area assignment.

FIG. 14 illustrates an example of small data transmission in RRC_INACTIVE without UE 110 context relocation, in accordance with certain embodiments. In the example of FIG. 14, the UE 110 is initially in RRC_INACTIVE state. Small data may refer to the communication of small data payloads (e.g., machine type communication (MTC) data) in network 100 or any other suitable data. Small uplink (UL) data arrives at the UE 110. At step 1, the UE 110 sends a RA preamble to the new gNB. At step 2, the new gNB sends a RAR message to the UE 110.

At step 3, the UE 110 sends an RRCConnectionResumeRequest (resumeId, causeValue="smallData", UlData) to the new gNB. In the example of FIG. 14, the UE 110 triggers the resumption by transmission of small data and may include some small data in Msg.3 or in conjunction with Msg.3, such as in subsequent transmissions after message 3. When the new gNB receives the RRCConnectionResumeRequest, it sends the RRCConnectionResumeRequest (including all parameters and the UL data) directly to the old gNB (at step 4) as part of a Retrieve UE context request or other message. The new gNB will route the message to the old gNB based on the resumeID that the UE 110 provided in the RRCConnectionResumeRequest.

According to one example embodiment, the RRCConnectionResumeRequest contains a security token (e.g., Short-MAC-I) calculated using the old security key (used by the UE 110 in the old cell) as well as other parameters such as a target cell ID/frequency band. The old gNB verifies the security token, to ensure the message is from the right UE 110.

According to another example embodiment, the RRCConnectionResumeRequest is integrity protected using the old security key (e.g., using PDCP integrity protection (PDCP MAC)). The old gNB verifies the integrity of the message.

According to another example embodiment, the RRCConnectionResumeRequest is integrity protected using a new security key (e.g., using PDCP integrity protection (PDCP MAC)). The new security key may be derived by the UE 110 in the new cell (e.g., based on the old key, plus additional parameters). The old gNB also derives the new key and uses this to verify the integrity of the message.

At this stage the old gNB has verified that it is the right UE 110 sending the resume request. As a result of this, the old gNB will forward the UE context to the new gNB and optionally include an UL Data ACK (step 5). Additionally the old gNB may forward the UL data to the (5G) Core Network. The UE context sent to the new gNB can contain information such as the new UE security key and/or the new UE Resume ID to be assigned to the UE 110. The old gNB will also store the context. Once the new gNB receives the context, it can generate an RRC message (e.g., RRCConnectionSuspend) which can be sent to the UE 110 with the optional UL data ACK. The RRC message can be encrypted and/or integrity protected using PDCP protocol. The RRC message may contain a new resume ID, new security parameter (e.g., NCC), and/or RAN area assignment. After the new gNB has sent the information to the UE 110 (and possibly received acknowledgement from the UE 110), the new gNB can delete the UE context locally.

In the example embodiments described above, thanks to the possibility to assign the UE 110 a Resume ID which is "pointing" to the old gNB it is possible to keep the context in the old gNB, since all subsequent signaling or data will be routed to the old gNB. This minimizes signaling, thereby reducing network congestion.

Additionally, the embodiment makes it possible to change the security keys for UE transactions. This has several benefits. For example, using new keys for every transaction may advantageously avoid the need to maintain PDCP sequence number when UE 110 is in RRC_INACTIVE, since all PDCP SNs can be set to 0 for a new key. If old key is used then SNs need to be maintained to protect against replay protection. As another example, using new keys makes it possible to relocate the context when desirable (network choice) since this can be done without giving access to the old keys to the new node (which should be avoided for security reasons). As another example, using new keys makes it possible to pre-populate the UE context in several RAN nodes to speed up signalling, since old keys does not need to be exposed.

FIG. 15 illustrates an example state transition from RRC_INACTIVE to RRC_CONNECTED without context relocation for small data transmission, in accordance with certain embodiments. In the example of FIG. 15, the UE 110 is initially in RRC_INACTIVE state. Small UL data arrives. At step 1, the UE 110 sends a RA preamble to the new gNB. At step 2, the new gNB sends a RAR message to the UE 110. At step 3, the UE 110 sends an RRCConnectionResumeRequest (resumeId, cause Value="smallData") to the new gNB.

In the example of FIG. 15, the UE 110 resumes its connection in a new gNB with a cause Value flag of "smallData." Alternatively, the causeValue flag could be "mo-signalling" to indicate that the UE 110 does a Tracking Area Update.

When the new gNB receives the RRCConnectionResumeRequest with the "small data" indication, at step 4 it sends a "Retrieve UE context request" message to the old gNB (located using the resumeId), and includes the "small data" indicator. In some embodiments the small data indication may be sent in conjunction with the Connection Resume Request. For illustrative purposes, two alternatives to the response of this message are disclosed.

According to a first example embodiment, the old gNB responds with a "retrieve UE context response" with the UE context including the parameters needed to suspend the UE 110 (resumeId, RanAreaInformation, NCC). According to a second example embodiment, the old gNB responds with a "Retrieve UE context response" with only the UE context.

In both the first and second example embodiments above, the new gNB creates a local copy of UE context and sends an RRCConnectionResume message to the UE 110 at step 6. The RRCConnectionResume message transitions the UE 110 to RRC_CONNECTED state.

At step 7, the UE 110 responds with a RRCConnectionResumeComplete, which may include UL data, which is then forwarded to the old gNB at step 8. Depending on configurations, the UE 110 may send a few subsequent data transmissions which are all forwarded to the old gNB. This is shown at step 9 in the example of FIG. 15.

When the UE 110 is finished with the "small data" transmission, it can indicate this in a variety of ways. As one example, the UE 110 can indicate this by a buffer status report, either sent before the first transmission, in between data, or after the last message indicating to the network how much data the UE 110 wants to send. As another example, the UE 110 can indicate this by an end of data marker indicating that the UE 110 has finished with the "small data" transmission. As still another example, the UE 110 can indicate this by a preconfigured size of the "small data"-if the standardization determines that "small data" only equals to a fixed number of maximum UL transmissions.

When the UE 110 has completed the UL traffic, the new gNB can decide to suspend the UE 110. This is shown in the example of FIG. 15 at step 11. In the first example embodiment above, where the new gNB received the configurations for the new ran Area and new resumeId, the new gNB indicates to the old gNB that the small data transmission is finished. In the second example embodiment above, the old gNB responds to this message with a UE suspend response including this information, shown in the example of FIG. 15 at step 13. After that, at step 14 the new gNB suspends the UE 110 with a resumeId pointing to the old gNB. As a last step, the new gNB deletes the UE context at step 15 and the UE context is stored in the old gNB. The UE 110 enters RRC_INACTIVE state.

In certain embodiments, different steps in the various embodiments described above can be combined to create new embodiments. In addition, the various embodiments described above can be enhanced with the following novel UE functionality. In certain embodiments, the UE 110 may indicate to the network (e.g., in the RRCConnectionResumeRequest) if the procedure should be executed without performing context fetch. This information may have been provided to the UE 110 in the RRCConnectionSuspend message (or other message). This will allow the new gNB to know which procedure to apply, which may advantageously lead to more efficient handling.

In certain embodiments, the UE 110 may indicate a counter or validity information related to UE context. This may allow the new gNB to determine if a local context of the UE 110 is still valid, which may advantageously lead to more efficient handling (no context fetch). The local context of the UE 110 could be a context used in previous access, or a pre-populated context. The UE 110 could either calculate an maintain counter or validity information or the information can be provided to the UE 110 in RRCConnectionSuspend.

In certain embodiments, the UE 110 could indicate how much data it has in its buffer, which may advantageously enable the new gNB or the old gNB to decide if the UE context should be relocated or not. Small amounts of data may be best served by keeping the context, while if a lot of data will be send it could be better to relocate to optimized data forwarding path in the network.

In certain embodiments, the UE 110 can derive different security keys depending on which node the UE 110 is connected to (or which cell). This may advantageously ensure different keys are generated for different nodes, which increases the security of the system.

Descriptions of Exemplary Network Components

Figure 16:
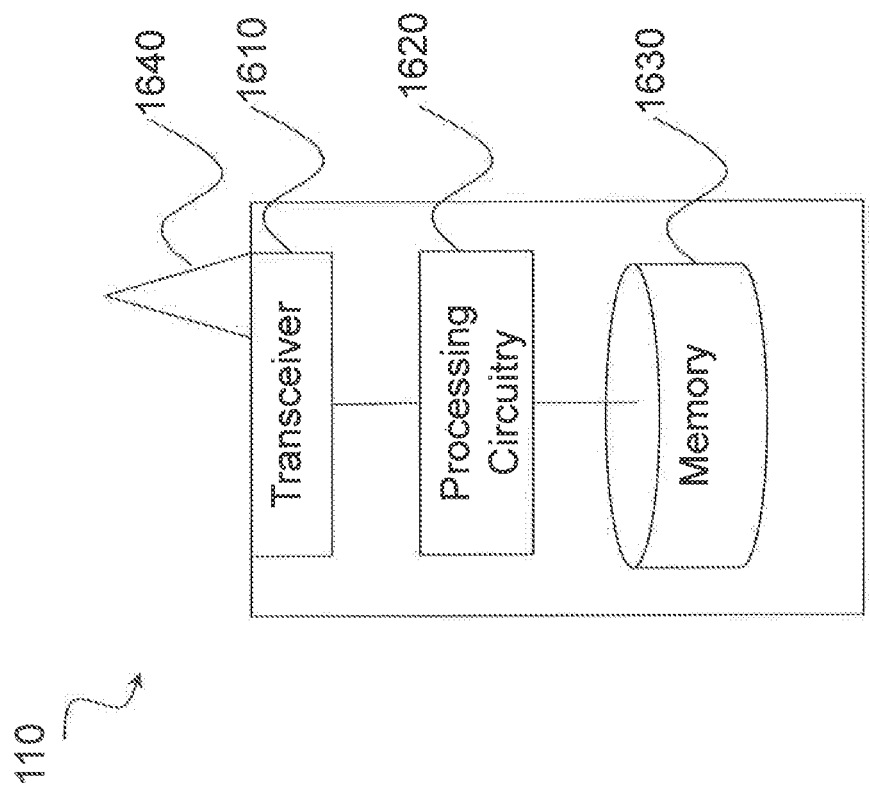
FIG. 16 is a block schematic of an exemplary wireless device, in accordance with certain embodiments.

FIG. 16 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE 110, a station (STA), a device, or a terminal in some embodiments. Wireless device 110 includes transceiver 1610, processing circuitry 1620, and memory 1630. In some embodiments, transceiver 1610 facilitates transmitting wireless signals to and receiving wireless signals from network node 115 (e.g., via an antenna), processing circuitry 1620 executes instructions to provide some or all of the functionality described above as being provided by wireless device 110, and memory 1630 stores the instructions executed by processing circuitry 1620.

Processing circuitry 1620 may include any suitable combination of hardware and software implemented in one or more modules to execute instructions and manipulate data to perform some or all of the described functions of wireless device 110, such as the functions of wireless device 110 described above in relation to FIGS. 1-15. In some embodiments, processing circuitry 1620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1630 is generally operable to store instructions, such as a computer program, software, an application including one or more of logic, rules, algorithms, code, tables, etc. and/or other instructions capable of being executed by processing circuitry 1620. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1620.

Other embodiments of wireless device 110 may include additional components beyond those shown in FIG. 16 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 1620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 17:
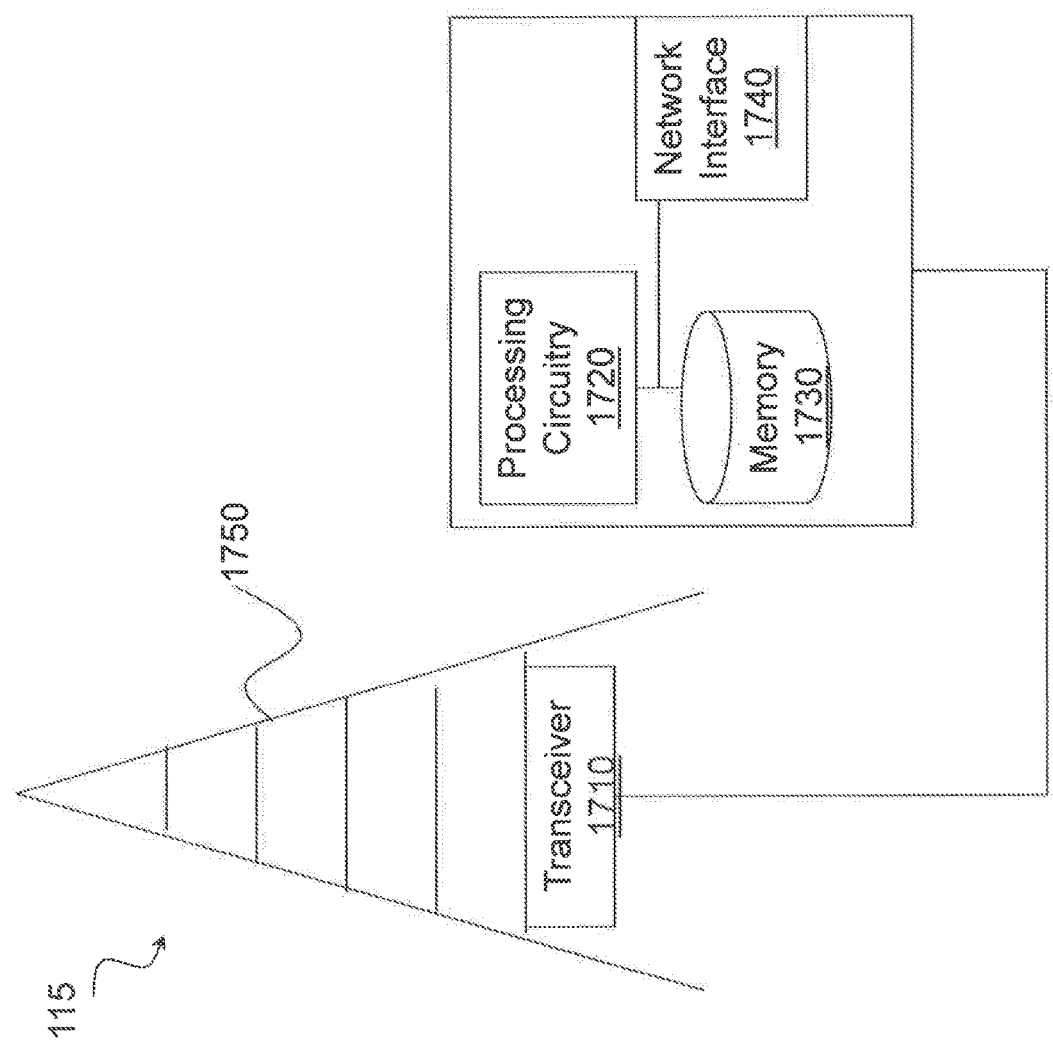
FIG. 17 is a block schematic of an exemplary network node, in accordance with certain embodiments.

FIG. 17 is a block schematic of an exemplary network node 115, in accordance with certain embodiments. Network node 115 may be any type of radio network node or any network node that communicates with a UE and/or with another network node. Examples of network node 115 include an eNodeB, gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS. SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1710, processing circuitry 1720, memory 1730, and network interface 1740. In some embodiments, transceiver 1710 facilitates transmitting wireless signals to and receiving wireless signals from wireless device 110 (e.g., via antenna 1750), processing circuitry 1720 executes instructions to provide some or all of the functionality described above as being provided by a network node 115, memory 1730 stores the instructions executed by processing circuitry 1720, and network interface 1740 communicates signals to backend network components, such as a gateway, switch, router, Internet, Public Switched Telephone Network (PSTN), core network nodes or radio network controllers 130, etc.

Processing circuitry 1720 may include any suitable combination of hardware and software implemented in one or more modules to execute instructions and manipulate data to perform some or all of the described functions of network node 115, such as those described above in relation to FIGS. 1-15. In some embodiments, processing circuitry 1720 may include, for example, one or more computers, one or more central processing units (CPUs), one or more microprocessors, one or more applications, and/or other logic.

Memory 1730 is generally operable to store instructions, such as a computer program, software, an application including one or more of logic, rules, algorithms, code, tables, etc. and/or other instructions capable of being executed by processing circuitry 1720. Examples of memory 1730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1740 is communicatively coupled to processing circuitry 1720 and may refer to any suitable device operable to receive input for network node 115, send output from network node 115, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of network node 115 may include additional components beyond those shown in FIG. 17 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 18:
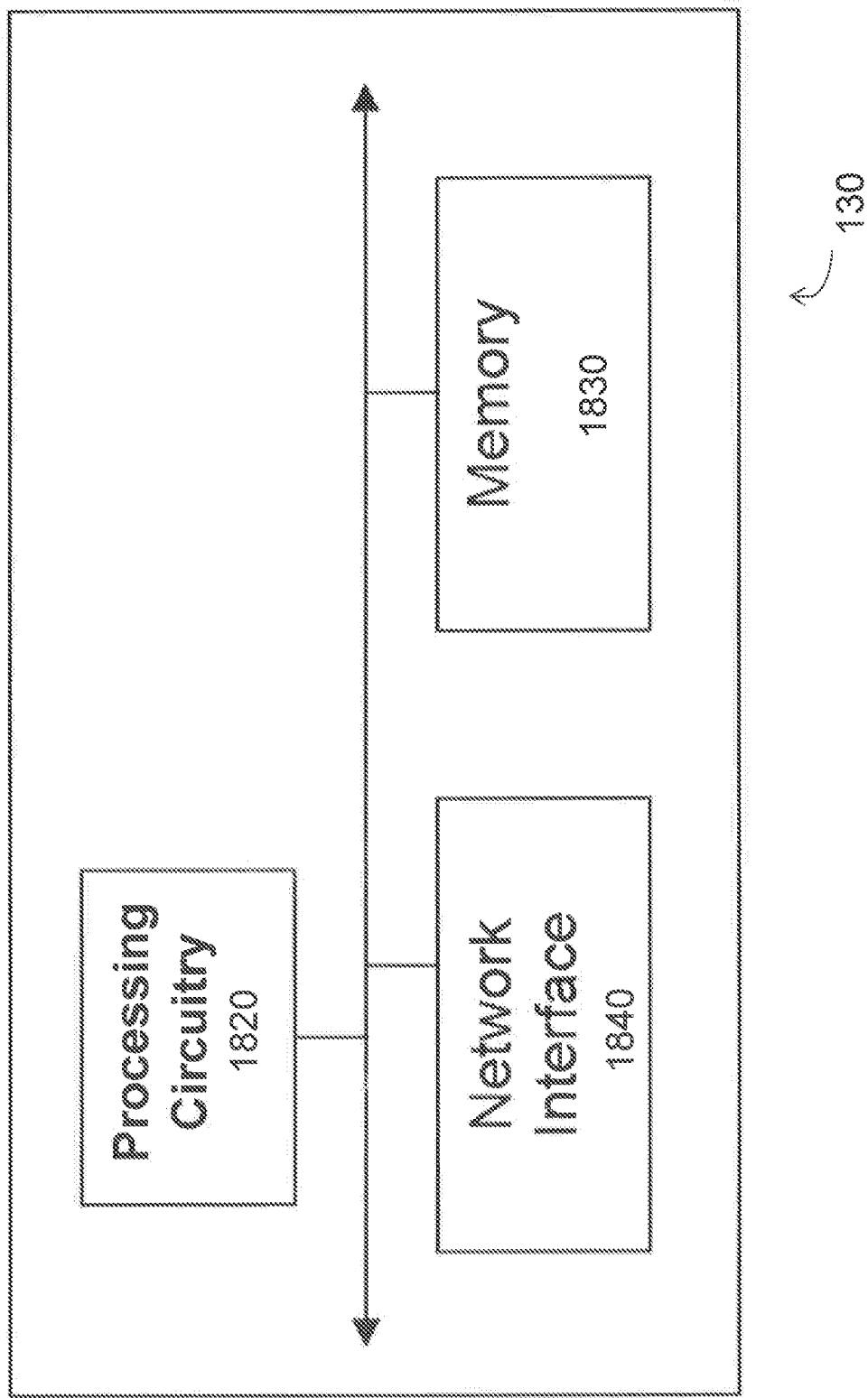
FIG. 18 is a block schematic of an exemplary radio network controller or core network node, in accordance with certain embodiments.

FIG. 18 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1820, memory 1830, and network interface 1840. In some embodiments, processing circuitry 1820 executes instructions to provide some or all of the functionality described above as being provided by the network node, memory 1830 stores the instructions executed by processing circuitry 1820, and network interface 1840 communicates signals to any suitable node, such as a gateway, switch, router, Internet, Public Switched Telephone Network (PSTN), network nodes 115, radio network controllers or core network nodes 130, etc.

Processing circuitry 1820 may include any suitable combination of hardware and software implemented in one or more modules to execute instructions and manipulate data to perform some or all of the described functions of the radio network controller or core network node 130. In some embodiments, processing circuitry 1820 may include, for example, one or more computers, one or more central processing units (CPUs), one or more microprocessors, one or more applications, and/or other logic.

Memory 1830 is generally operable to store instructions, such as a computer program, software, an application including one or more of logic, rules, algorithms, code, tables, etc. and/or other instructions capable of being executed by processing circuitry 1820. Examples of memory 1830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 1840 is communicatively coupled to processing circuitry 1820 and may refer to any suitable device operable to receive input for the network node, send output from the network node, perform suitable processing of the input or output or both, communicate to other devices, or any combination of the preceding. Network interface 1840 may include appropriate hardware (e.g., port, modem, network interface card, etc.) and software, including protocol conversion and data processing capabilities, to communicate through a network.

Other embodiments of the network node may include additional components beyond those shown in FIG. 18 that may be responsible for providing certain aspects of the network node's functionality, including any of the functionality described above and/or any additional functionality (including any functionality necessary to support the solution described above).

Figure 19:
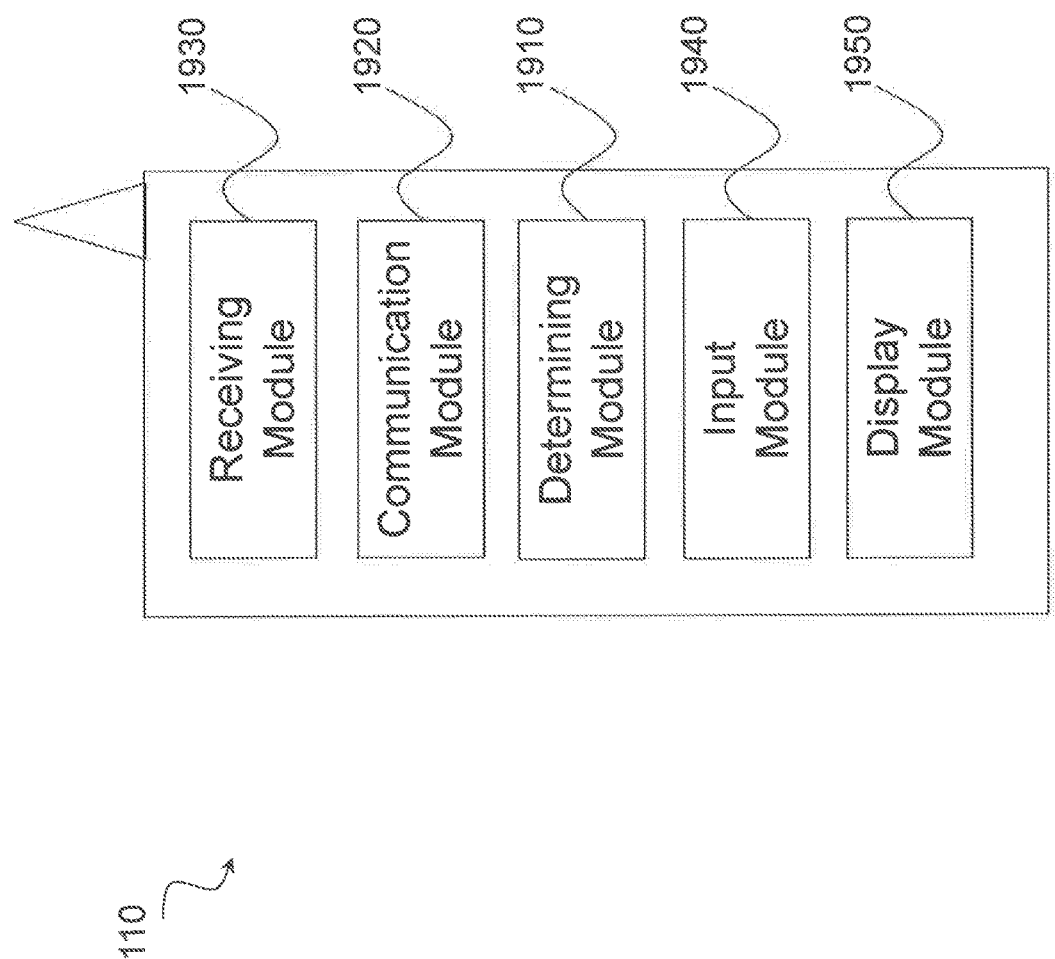
FIG. 19 is a block schematic of an exemplary wireless device, in accordance with certain embodiments.

FIG. 19 is a schematic block diagram of an exemplary wireless device, in accordance with certain embodiments. Wireless device 110 may include one or more modules. For example, wireless device 110 may include a determining module 1910, a communication module 1920, a receiving module 1930, an input module 1940, a display module 1950, and any other suitable modules. In some embodiments, one or more of determining module 1910, communication module 1920, receiving module 1930, input module 1940, display module 1950, or any other suitable module may be implemented using one or more processors, such as processing circuitry 1620 described above in relation to FIG. 16. In certain embodiments, the functions of two or more of the various modules may be combined into a single module. Wireless device 110 may perform the methods for RRC resume without context fetch described above with respect to FIGS. 1-15.

Determining module 1910 may perform the processing functions of wireless device 110. Determining module 1910 may include or be included in one or more processors, such as processing circuitry 1620 described above in relation to FIG. 16. Determining module 1910 may include analog and/or digital circuitry configured to perform any of the functions of determining module 1910 and/or processing circuitry 1620 described above. The functions of determining module 1910 described above may, in certain embodiments, be performed in one or more distinct modules.

Communication module 1920 may perform the transmission functions of wireless device 110. As one example, communication module 1930 may send a connection resume request to a first network node (e.g., a new network node), the connection resume request including a resume identification associated with a second network node (e.g., an old network node). Communication module 1920 may include a transmitter and/or a transceiver, such as transceiver 1610 described above in relation to FIG. 16. Communication module 1920 may include circuitry configured to wirelessly transmit messages and/or signals. In particular embodiments, communication module 1920 may receive messages and/or signals for transmission from determining module 1910. In certain embodiments, the functions of communication module 1920 described above may be performed in one or more distinct modules.

Receiving module 1930 may perform the receiving functions of wireless device 110. For example, receiving module 1930 may receive an RRC response message from the second network node that is transparently forwarded to the wireless device by the first network node. As another example, receiving module 1930 may obtain the resume identification associated with the second network node.

Receiving module 1930 may include a receiver and/or a transceiver. Receiving module 1930 may include a receiver and/or a transceiver, such as transceiver 1610 described above in relation to FIG. 16. Receiving module 1930 may include circuitry configured to wirelessly receive messages and/or signals. In particular embodiments, receiving module 1930 may communicate received messages and/or signals to determining module 1910. The functions of receiving module 1930 described above may, in certain embodiments, be performed in one or more distinct modules.

Input module 1940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1910. The functions of input module 1940 described above may, in certain embodiments, be performed in one or more distinct modules.

Display module 1950 may present signals on a display of wireless device 110. Display module 1950 may include the display and/or any appropriate circuitry and hardware configured to present signals on the display. Display module 1950 may receive signals to present on the display from determining module 1910. The functions of display module 1950 described above may, in certain embodiments, be performed in one or more distinct modules.

Determining module 1910, communication module 1920, receiving module 1930, input module 1940, and display module 1950 may include any suitable configuration of hardware and/or software. Wireless device 110 may include additional modules beyond those shown in FIG. 19 that may be responsible for providing any suitable functionality, including any of the functionality described above and/or any additional functionality (including any functionality necessary to support the various solutions described herein).

Figure 20:
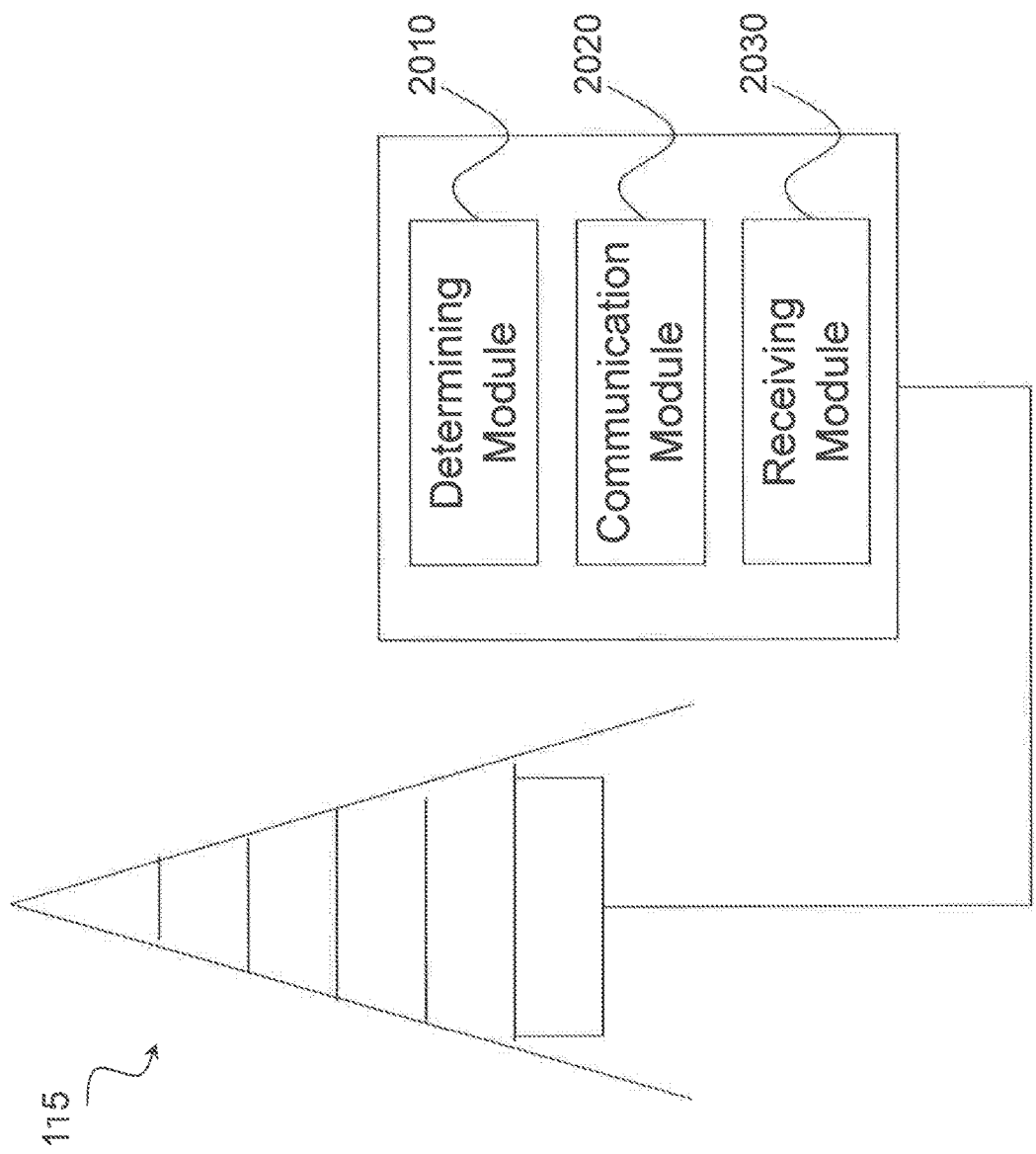
FIG. 20 is a block schematic of an exemplary network node, in accordance with certain embodiments.

FIG. 20 is a schematic block diagram of an exemplary network node 115, in accordance with certain embodiments. Network node 115 may include one or more modules. For example, network node 115 may include determining module 2010, communication module 2020, receiving module 2030, and any other suitable modules. In some embodiments, one or more of determining module 2010, communication module 2020, receiving module 2030, or any other suitable module may be implemented using one or more processors, such as processing circuitry 1720 described above in relation to FIG. 17. In certain embodiments, the functions of two or more of the various modules may be combined into a single module. Network node 115 may perform the methods for RRC resume without context fetch described above with respect to FIGS. 1-15.

Determining module 2010 may perform the processing functions of network node 115. In certain embodiments, network node 115 may perform the functions of the first network node (or new gNB) described herein. In such a scenario, determining module 2010 may create a local UE context and releasing the local UE context after suspending the wireless device. In certain embodiments, network node 115 may perform the functions of the second network node (or old gNB) described herein. In such a scenario, determining module 2010 verify the connection resume request. As another example, determining module 2010 may generate an RRC response message for the wireless device. As still another example, determining module 2010 may assign a resume identification to the wireless device, the resume identification associated with the second network node.

Determining module 2010 may include or be included in one or more processors, such as processing circuitry 1720 described above in relation to FIG. 17. Determining module 2010 may include analog and/or digital circuitry configured to perform any of the functions of determining module 2010 and/or processing circuitry 1720 described above. The functions of determining module 2010 may, in certain embodiments, be performed in one or more distinct modules.

Communication module 2020 may perform the transmission functions of network node 115. In certain embodiments, network node 115 may perform the functions of the first network node (or new gNB) described herein. In such a scenario, communication module 2020 may send the connection resume request to the second network node associated with the resume identification based on the resume identification included in the connection resume request. As another example, communication module 2020 may forward an RRC response message from the second network node to the wireless device. As still another example, communication module 2020 may send the connection resume request to the second network node as part of a Retrieve UE Context request or other message. In some embodiments, communication module 2020 may send the connection resume request to the second network node in conjunction with a Retrieve UE Context request or other message.

In certain embodiments, network node 115 may perform the functions of the second network node (or old gNB). In such a scenario, communication module 2020 may send the RRC response message to the wireless device via the first network node. As another example, communication module 2020 may send a UE context response to the first network node.

Communication module 2020 may transmit messages to one or more of wireless devices 110. Communication module 2020 may include a transmitter and/or a transceiver, such as transceiver 1710 described above in relation to FIG. 17. Communication module 2020 may include circuitry configured to wirelessly transmit messages and/or signals. In particular embodiments, communication module 2020 may receive messages and/or signals for transmission from determining module 2010 or any other module. The functions of communication module 2020 may, in certain embodiments, be performed in one or more distinct modules.

Receiving module 2030 may perform the receiving functions of network node 115. In certain embodiments, network node 115 may perform the functions of the first network node (or new gNB) described herein. In such a scenario, receiving module 2030 may receive a connection resume request from a wireless device, the connection resume request including a resume identification associated with a second network node. As another example, receiving module 2030 may receive a UE context response from the second network node.

In certain embodiments, network node 115 may perform the functions of the second network node (or old gNB). In such a scenario, receiving module 2030 may receive a connection resume request for a wireless device from a first network node, the connection resume request including a resume identification associated with the second network node. As another example, receiving module 2030 may receive the connection resume request from the first network node as part of a Retrieve UE Context request or other message. In some embodiments, receiving module 2030 may receive the connection resume request from the first network node in conjunction with a Retrieve UE Context request or other message.

Receiving module 2030 may receive any suitable information from a wireless device. Receiving module 2030 may include a receiver and/or a transceiver, such as transceiver 1710 described above in relation to FIG. 17. Receiving module 2030 may include circuitry configured to wirelessly receive messages and/or signals. In particular embodiments, receiving module 2030 may communicate received messages and/or signals to determining module 2010 or any other suitable module. The functions of receiving module 2030 may, in certain embodiments, be performed in one or more distinct modules.

Determining module 2010, communication module 2020, and receiving module 2030 may include any suitable configuration of hardware and/or software. Network node 115 may include additional modules beyond those shown in FIG. 20 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
Abbreviation Description
3GPP Third Generation Partnership Project
AP Access Point
AS Access Stratum
BS Base Station
Base Station Controller BSC
BTS Base Transceiver Station
CN Core Network
CPE Customer Premises Equipment
D2D Device-to-device
DAS Distributed Antenna System
DCI Downlink Control Information
DL Downlink
eNB evolved Node B
EPC Evolved Packet Core
FDD Frequency Division Duplex
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MSR Multi-standard Radio
NAS Non-Access Stratum
NR New Radio
OFDM Orthogonal Frequency Division Multiplexing
PDCCH Physical Downlink Control Channel
PDSCH Physical Downlink Shared Channel
PSTN Public Switched Telephone Network
PUSCH Physical Uplink Shared Channel
PUCCH Physical Uplink Control Channel
RA Random Access
RAR Random Access Response
RAN Radio Access Network
RB Resource Block
RNC Radio Network Controller
RRC Radio Resource Control
RRH Remote Radio Head
RRU Remote Radio Unit
TA Tracking Area
TAU Tracking Area Update
TDD Time Division Duplex
TFRE Time Frequency Resource Element
UCI Uplink Control Information
UE User Equipment
UL Uplink
WAN Wide Area Network

The invention claimed is:

1. A method in a user equipment (UE) for communicating with a target network node, comprising:
  while the UE is in an inactive state, transmitting a connection resume request to the target network node, the connection resume request including a resume identification associated with a source network node previously communicating with the UE; and receiving a radio resource control (RRC) response originating from the source network node and forwarded to the UE by the target network node.

2. The method of claim 1, further comprising obtaining the resume identification associated with the source network node.

3. The method of claim 1, wherein the target network node is a gNB and the source network node is a gNB.

4. The method of claim 1, wherein the RRC response is an RRCConnection Suspend.

5. The method of claim 1, wherein the connection resume request is an RRCConnectionResumeRequest.

6. The method of claim 1, wherein the connection resume request comprises a security token.

7. The method of claim 6, wherein the security token comprises a message authentication code-integrity (MAC-I).

8. The method of claim 6, wherein the security token comprises a short message authentication code-integrity (Short-MAC-I).

9. The method of claim 1, wherein the connection resume request is integrity protected using a security key used during previous communications with the source network node.

10. The method of claim 1, wherein the RRC response comprises a new resume identification associated with the source network node.

11. The method of claim 1, wherein the RRC response comprises a new security parameter.

12. The method of claim 1, wherein the RRC response comprises a radio access network (RAN) area assignment.

13. The method of claim 1, wherein small data is transmitted as part of or in conjunction with the connection resume request.

14. A user equipment (UE) for communicating with a target network node, comprising:
    processing circuitry configured to operate in a RRC_INACTIVE state; and
    an interface operably coupled to the processing circuitry; the interface configured to:
        while the UE is in an inactive state, transmit a connection resume request to the target network node, the connection resume request including a resume identification associated with a source network node previously communicating with the UE; and
        receive a radio resource control (RRC) response originating from the source network node and forwarded to the UE by the target network node.

15. The UE of claim 14, wherein the interface is further configured to obtain the resume identification associated with the source network node.

16. The UE of claim 14, wherein the target network node is a gNB and the source network node is a gNB.

17. The UE of claim 14, wherein the RRC response is an RRCConnectionSuspend.

18. The UE of claim 14, wherein the connection resume request is an RRCConnectionResumeRequest.

19. The UE of claim 14, wherein the connection resume request comprises a security token.

20. The UE of claim 19, wherein the security token comprises a message authentication code-integrity (MAC-I).

21. The UE of claim 19, wherein the security token comprises a short message authentication code-integrity (Short-MAC-I).

22. The UE of claim 14, wherein the connection resume request is integrity protected using a security key used during previous communications with source network node.

23. The UE of claim 14, wherein the RRC response comprises a new resume identification associated with the source network node.

24. The UE of claim 14, wherein the RRC response comprises a new security parameter.

25. The UE of claim 14, wherein the RRC response comprises a radio access network (RAN) area assignment.

26. The UE of claim 14, wherein small data is transmitted as part of or in conjunction with the connection resume request.

27. A method in a target network node for communicating with a user equipment (UE) that was previously in communication with a source network node, comprising:
    receiving a connection resume request from a UE in an inactive state, the connection resume request comprises a resume identification associated with the source network node;
    transmitting a retrieve UE context request to the source network node;
    receiving UE context information from the source network node in response to the retrieve UE context request; and
    transmitting a radio resource control (RRC) response to the UE.

28. The method of claim 27, wherein the connection resume request comprises a security token.

29. The method of claim 28, wherein the security token comprises a message authentication code-integrity (MAC-I).

30. The method of claim 28, wherein the security token comprises a short message authentication code-integrity (Short-MAC-I).

31. The method of claim 27, wherein the connection resume request is integrity protected using a security key used during the previous communications with the source network node.

32. The method of claim 27, wherein the RRC response comprises a new resume identification associated with the source network node.

33. The method of claim 27, wherein the RRC response comprises a new security parameter.

34. The method of claim 27, wherein the RRC response comprises a radio access network (RAN) area assignment.

35. The method of claim 27, wherein the connection resume request is forwarded to the source network node as part of or in conjunction with the retrieve UE context request.

36. A target network node for communicating with a user equipment (UE) that was previously in communication with a source network node, comprising:
    processing circuitry;
    a memory storing instructions which, when executed by the processing circuitry, causes the target network node to:
        receive a connection resume request from the UE in an inactive state, wherein the connection resume request comprises a resume identification associated with the source network node;
        transmit a retrieve UE context request to the source network node;
        receive UE context information from the source network node in response to the retrieve UE context request; and transmit a radio resource control (RRC) response to the UE.

37. The target network node of claim 36, wherein the connection resume request comprises a security token.

38. The target network node of claim 37, wherein the security token comprises a message authentication code-integrity (MAC-I).

39. The target network node of claim 37, wherein the security token comprises a short message authentication code-integrity (Short-MAC-I).

40. The target network node of claim 36, wherein the connection resume request is integrity protected using a security key used during the previous communications with the source network node.

41. The target network node of claim 36, wherein the RRC response comprises a new resume identification associated with the source network node.

42. The target network node of claim 36, wherein the RRC response comprises a new security parameter.

43. The target network node of claim 36, wherein the RRC response comprises a radio access network (RAN) area assignment.

44. The target network node of claim 36, wherein small data is received as part of or in conjunction with the connection resume request.

45. A method in a source network node for facilitating communications between a user equipment (UE) and a target network node, comprising:
receiving a connection resume request for the UE in an inactive state forwarded from the target network node, the connection resume request including a resume identification associated with the source network node;
verifying the connection resume request for the UE;
generating a radio resource control (RRC) response for the UE; and
transmitting the RRC response to the UE via the target network node.

46. The method of claim 45, wherein the connection resume request comprises a security token.

47. The method of claim 46, wherein the security token comprises a message authentication code-integrity (MAC-I).

48. The method of claim 46, wherein the security token comprises a short message authentication code-integrity (Short-MAC-I).

49. The method of claim 45, wherein the connection resume request is integrity protected using a security key used during previous communications with the UE.

50. The method of claim 45, wherein the RRC response comprises a new resume identification associated with the source network node.

51. The method of claim 45, wherein the RRC response comprises a new security parameter.

52. The method of claim 45, wherein the RRC response comprises a radio access network (RAN) area assignment.

53. The method of claim 45, wherein small data is received as part of or in conjunction with the connection resume request.

54. The method of claim 45, wherein the source network node receives the connection resume request forwarded from the target network node as part of or in conjunction with a retrieve UE context request.

55. The method of claim 45, further comprising assigning a resume identification to the UE, the resume identification associated with the source network node.

56. A source network node for facilitating communications between a user equipment (UE) and a target network node, comprising:
an interface configured to receive a connection resume request for the UE in an inactive state forwarded from the target network node, the connection resume request including a resume identification associated with the source network node;
processing circuitry operably coupled to the interface, the processing circuitry configured to:
verify the connection resume request for the UE; and
generate a radio resource control (RRC) response for the UE; and
the interface further configured to transmit the RRC response to the UE via the target network node.

57. The source network node of claim 56, wherein the connection resume request comprises a security token.

58. The source network node of claim 56, wherein the security token comprises a message authentication code-integrity (MAC-I).

59. The target network node of claim 56, wherein the security token comprises a short message authentication code-integrity (Short-MAC-I).

60. The source network node of claim 55, wherein the connection resume request is integrity protected using a security key used during previous communications with the UE.

61. The source network node of claim 55, wherein the RRC response comprises a new resume identification associated with the source network node.

62. The source network node of claim 55, wherein the RRC response comprises a new security parameter.

63. The source network node of claim 55, wherein the RRC response comprises a radio access network (RAN) area assignment.

64. The source network node of claim 55, wherein small data is received as part of or in conjunction with the connection resume request.

65. The source network node of claim 55, wherein the interface is further configured to receive the connection resume request forwarded from the target network node as part of or in conjunction with a retrieve UE context request.

66. The source network node of claim 55, wherein the processing circuitry is further configured to assign a resume identification to the UE, the resume identification associated with the source network node.

* * * * *